(12) United States Patent
Togino

(10) Patent No.: US 7,236,278 B2
(45) Date of Patent: Jun. 26, 2007

(54) PROJECTION OPTICAL APPARATUS

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 75 days.

(21) Appl. No.: 10/809,510

(22) Filed: Mar. 26, 2004

(65) Prior Publication Data

US 2004/0196438 A1 Oct. 7, 2004

(30) Foreign Application Priority Data

Mar. 28, 2003 (JP) .............................. 2003-091340

(51) Int. Cl.
*G02B 5/32* (2006.01)
(52) U.S. Cl. ..................... 359/15; 359/449; 359/451; 359/599; 353/94
(58) Field of Classification Search ...................... None
See application file for complete search history.

(56) References Cited

U.S. PATENT DOCUMENTS

| 4,799,739 A | * | 1/1989 | Newswanger | ................ | 359/15 |
| 5,757,544 A | * | 5/1998 | Tabata et al. | ................ | 359/434 |
| 2003/0137731 A1 | * | 7/2003 | Takahashi et al. | .......... | 359/462 |

FOREIGN PATENT DOCUMENTS

| JP | 06-230738 | | 8/1994 |
| JP | 10-115878 | | 5/1998 |
| JP | 11-084291 | | 3/1999 |
| JP | 2001-281583 | | 10/2001 |
| JP | 2004301876 A | * | 10/2004 |

* cited by examiner

Primary Examiner—Arnel Lavarias
(74) Attorney, Agent, or Firm—Kenyon & Kenyon LLP

(57) ABSTRACT

A projection optical apparatus is provided that is fast and of satisfactory illumination efficiency albeit being of simple construction and compact size including at least three projection optical systems for magnifying and projecting an image appearing on a display device, and further including a concave mirror for projecting exit pupils of the projection optical systems onto a viewer side and a diffusing plate comprising a transmission hologram, which is located near to images projected through the projection optical systems for magnifying the images of the exit pupils of the projection optical system upon projected by the concave mirror. The image of the exit pupil of each projection optical system projected by the concave mirror and magnified through the diffusing plate comprising a transmission hologram is projected in a mutually, at least partially overlapping fashion.

12 Claims, 21 Drawing Sheets

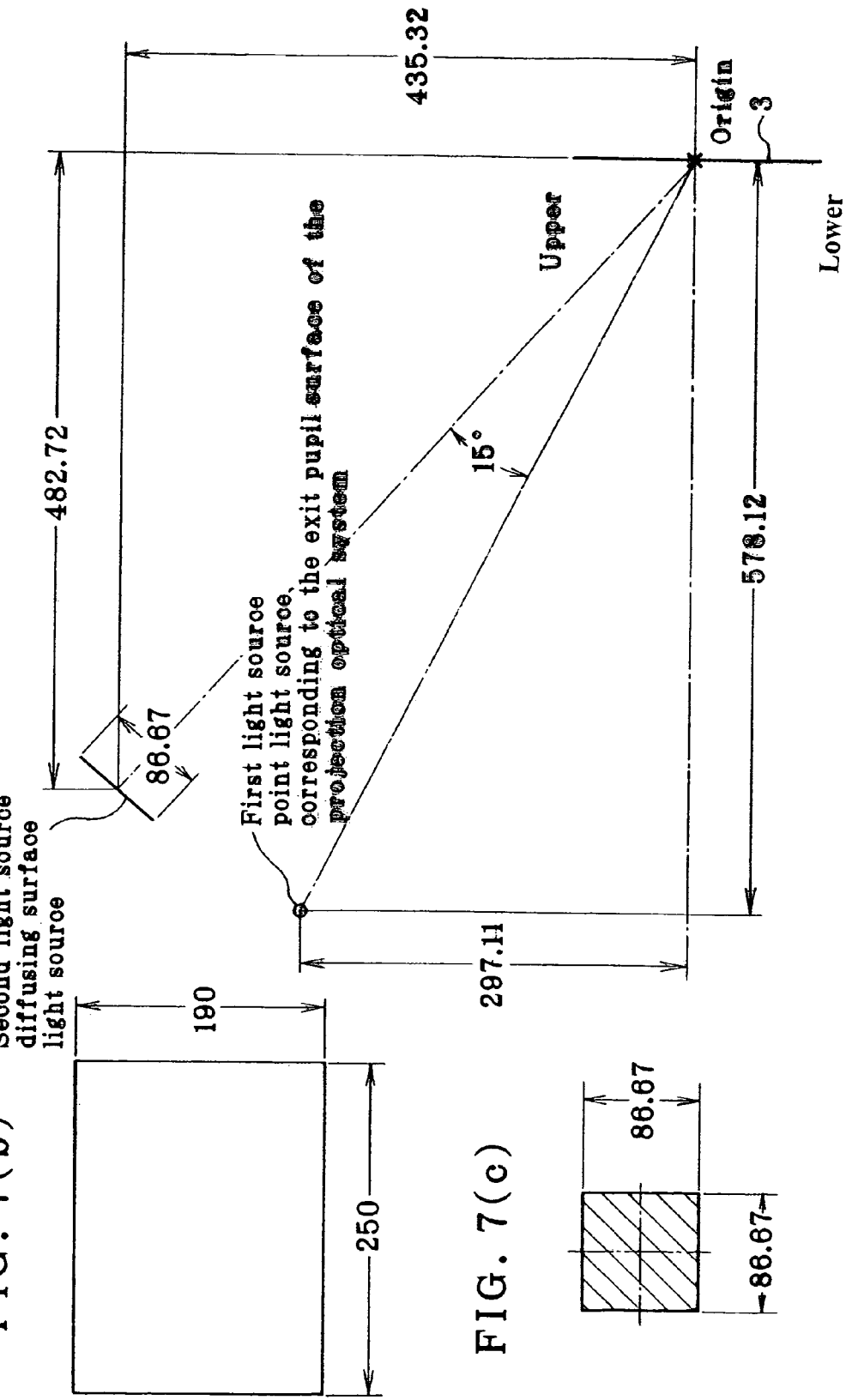
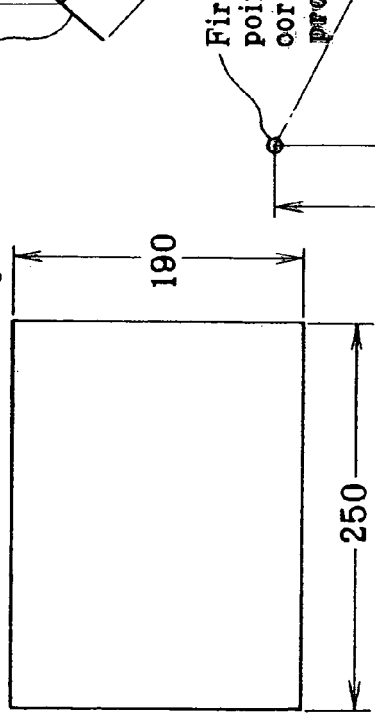
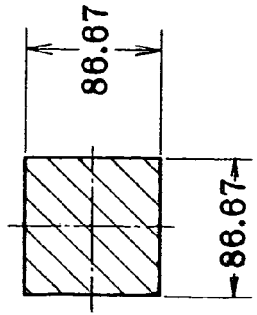
FIG. 7(a)
FIG. 7(b)
FIG. 7(c)

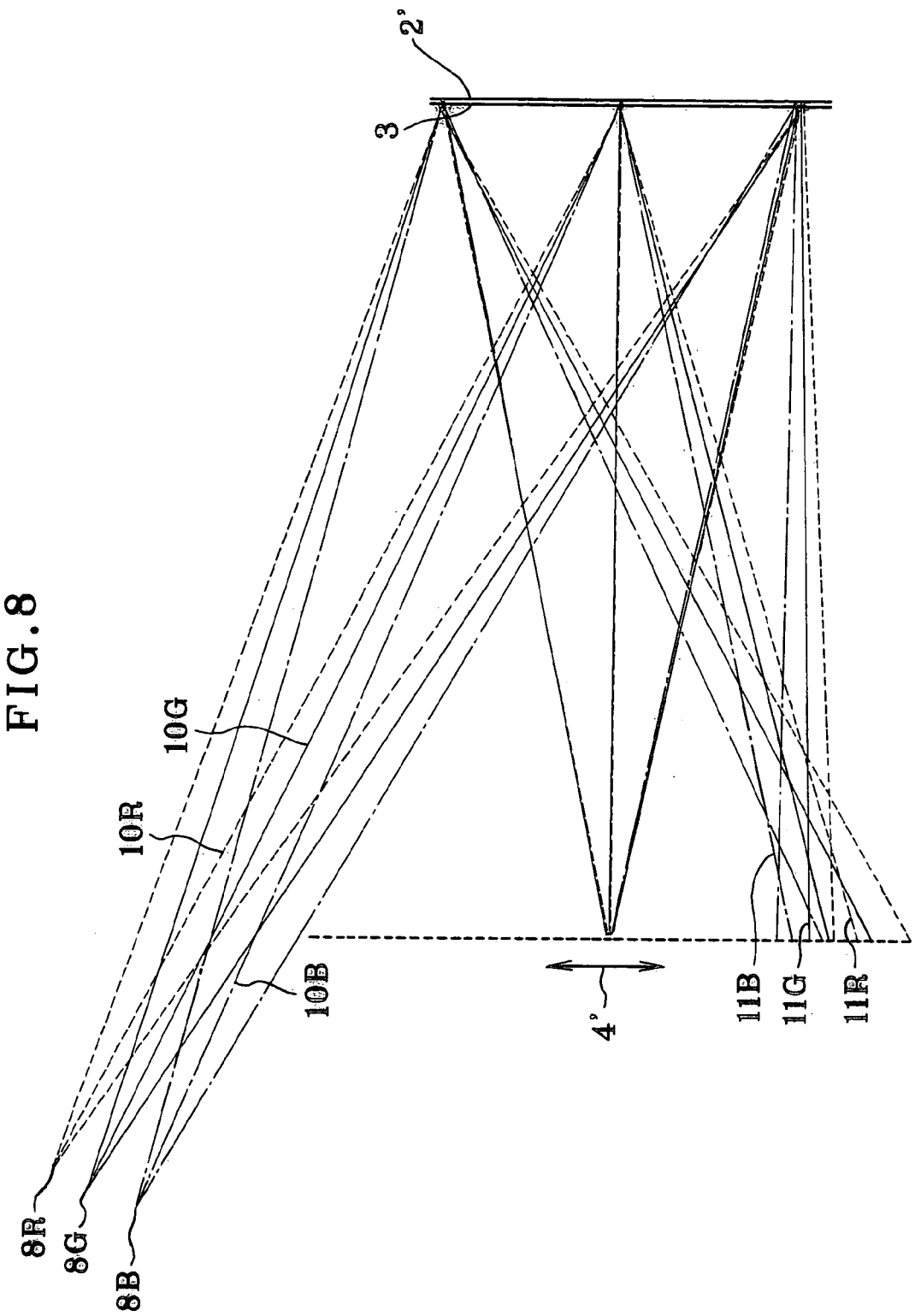

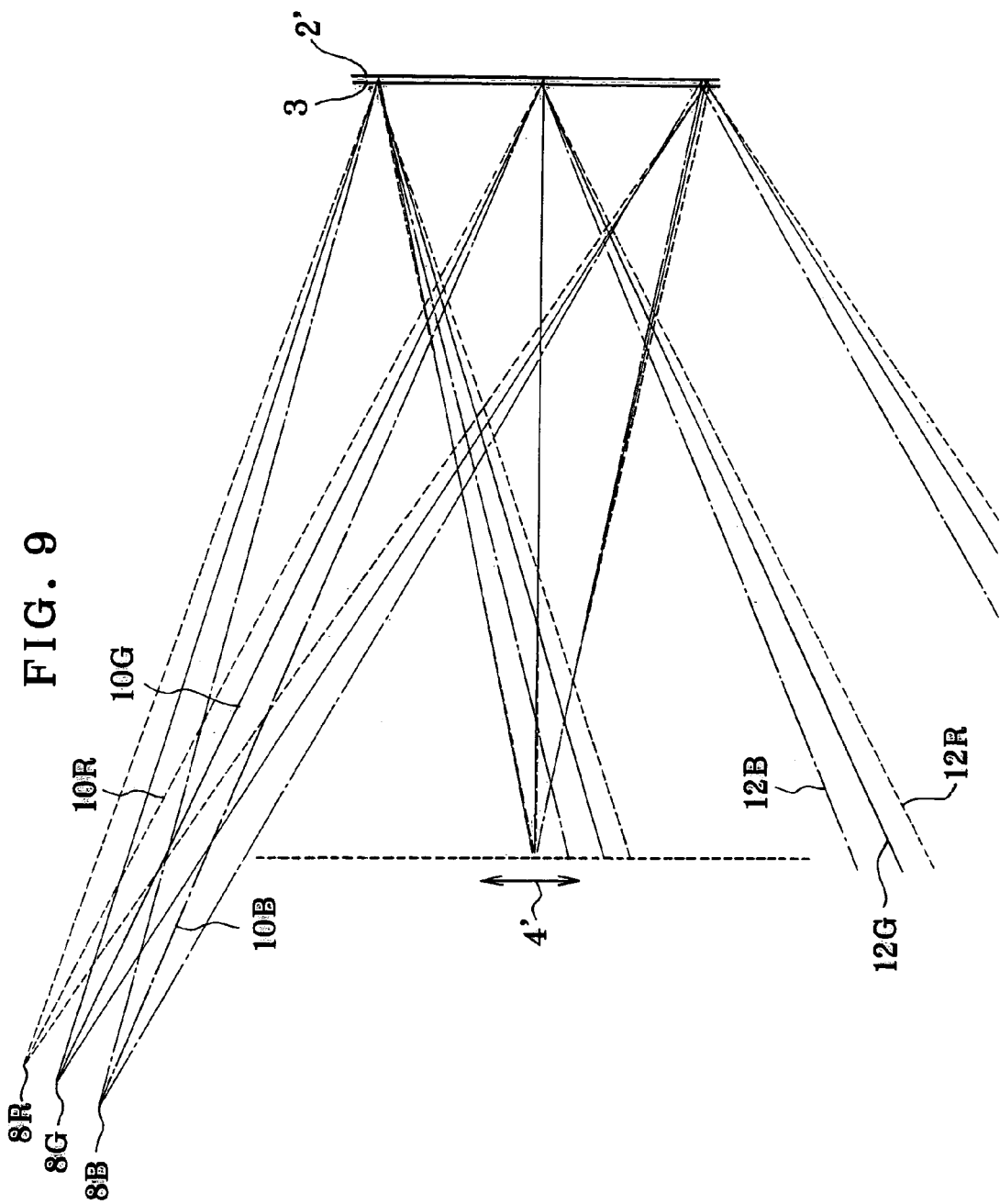

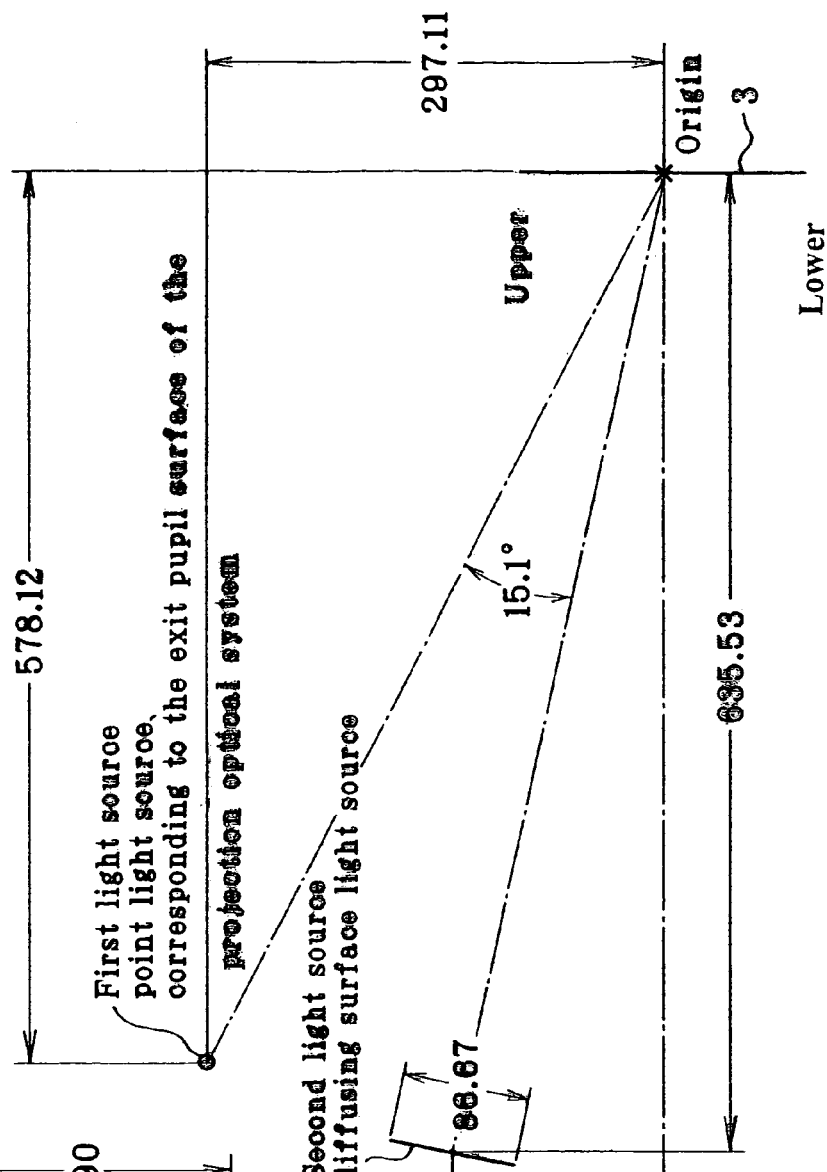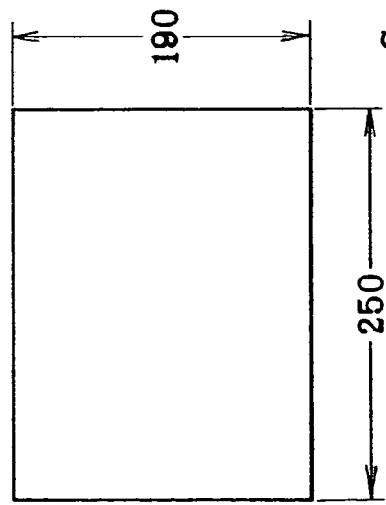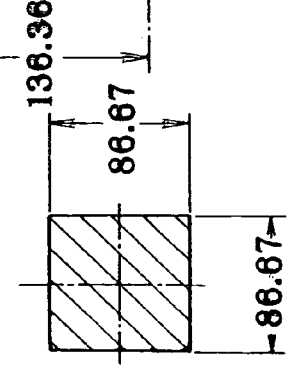
FIG. 10(a)
FIG. 10(b)
FIG. 10(c)

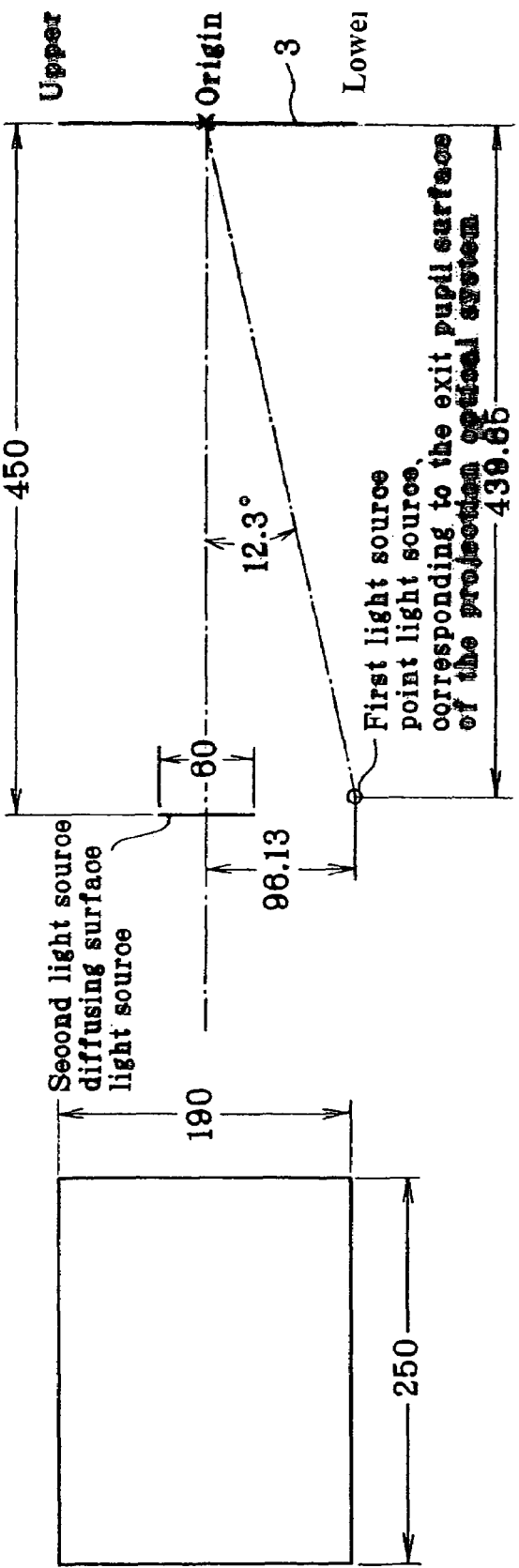
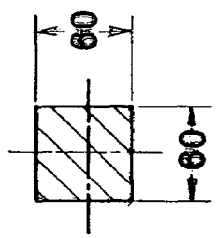

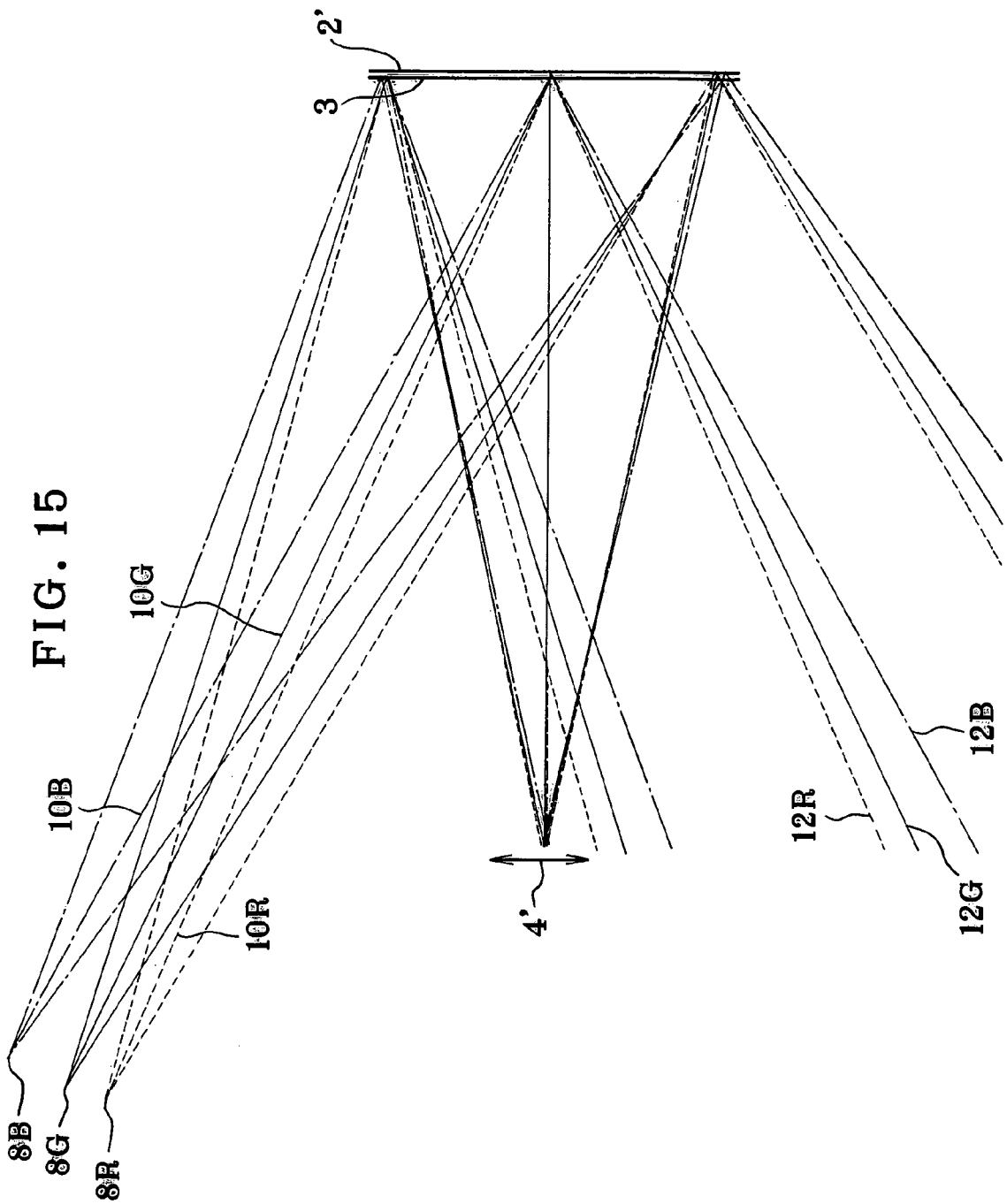

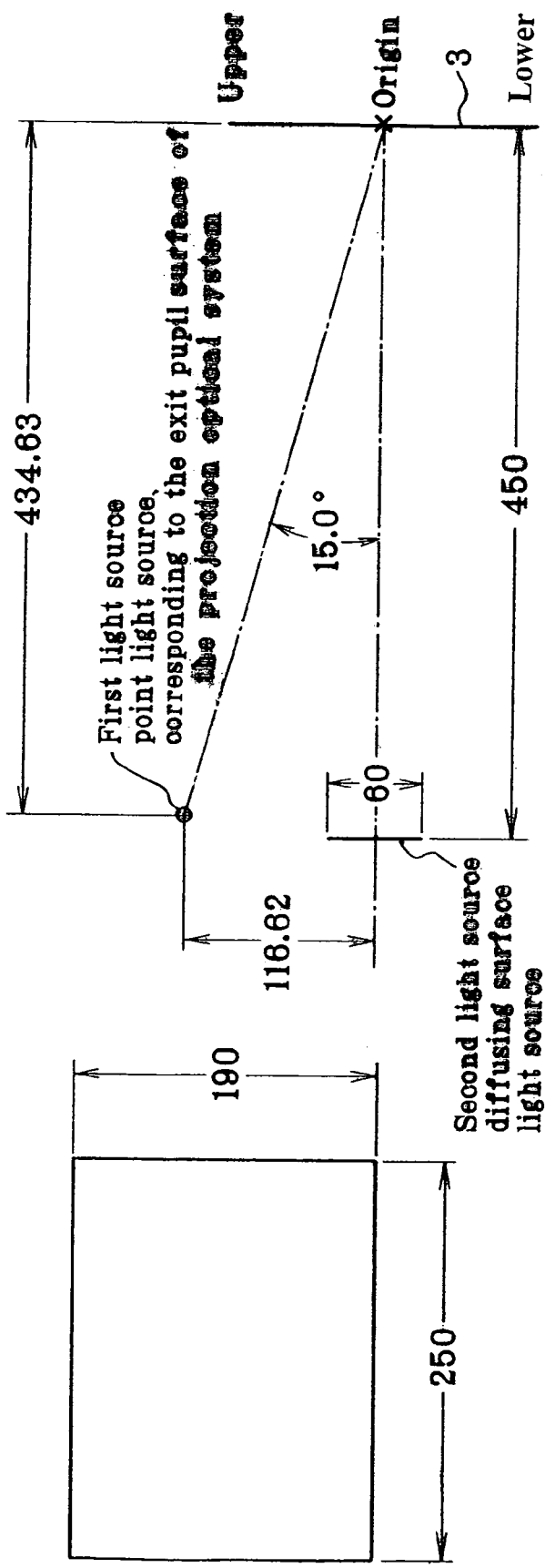
FIG. 16(a)
FIG. 16(b)
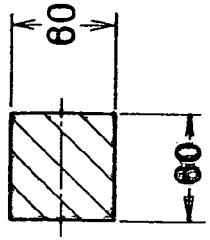
FIG. 16(c)

PROJECTION OPTICAL APPARATUS

This application claims benefits of Japanese Application No. 2003-91340 filed in Japan on Mar. 28, 2003, the contents of which are incorporated by this reference.

BACKGROUND OF THE INVENTION

The present invention relates generally to a projection optical apparatus, and more particularly to a projection optical apparatus incorporating a diffusing plate comprising a hologram.

So far, various projection optical apparatuses with diffusing holograms incorporated therein as screens have been proposed in the art. However, a screen incorporating a conventional diffusion hologram is used to diffuse light coming from an image projected onto a screen plane in such a way that the light is spread over to some extents. This is also true for an ordinary diffusing screen with white pigments or transparent particles contained in it. However, the diffusion hologram, because of being capable of limiting the angle of diffusion of diffuse light leaving the same, can project a relatively bright image.

SUMMARY OF THE INVENTION

The present invention provides a projection optical apparatus comprising at least three projection optical systems, each of which comprises a display device, for magnifying and projecting an image shown on said display device, a concave mirror for projecting exit pupils of said at least three projection optical systems onto a viewer side and a diffusing plate comprising a transmission hologram, which is located near to images projected through said at least three projection optical systems to magnify images of the exit pupils of said at least three projection optical systems upon projected through said concave mirror, characterized in that the images of the exit pupils of the projection optical systems, projected by said concave mirror and magnified through said diffusing plate comprising a transmission hologram are projected in a mutually, at least partially overlapping manner.

Preferably in an arrangement wherein light rays propagating from said at least three projection optical systems to said magnified images of the exit pupils of the projection optical systems transmit twice through said diffusing plate comprising a transmission hologram, the angle of the first transmission of said light rays transmitting through said diffusing plate comprising a transmission hologram is different from the angle of the second transmission of said light rays through said diffusing plate comprising a transmission hologram.

It is also preferable that said concave mirror comprises a Fresnel concave reflecting mirror.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2(a) shows that the diffusing plate has a diffusion action alone and does not reflex an optical path, FIG. 2(b) shows that the diffusing plate flexes light in a direction where the angle of diffraction decreases with respect to the angle of incidence to a normal, and FIG. 2(c) shows that the diffusing plate flexes an optical path in a direction where the angle of diffraction increases with respect to the angle of incidence.

FIG. 3(a) shows that the diffusing plate reflexes light in a direction where the angle of diffraction increases with respect to the angle of incidence to a normal and FIG. 3(b) shows that the diffusing plate reflexes light in a direction where the angle of diffraction increases with respect to the angle of incidence.

FIGS. 7(a), 7(b) and 7(c) are illustrative of an arrangement to fabricate a transmission hologram used as the diffusing plate in Example 1 of the invention; FIG. 7(a) shows position relations of the transmission hologram to a point light source, and a diffusing surface light source, FIG. 7(b) shows the size of the hologram, and FIG. 7(c) shows the size of the diffusing surface light source.

FIG. 8 is similar to FIG. 5 for Example 2.

FIG. 9 is similar to FIG. 6 for Example 2.

FIGS. 10(a), 10(b) and 10(c) are similar to FIGS. 7(a), 7(b) and 7(c) for Example 2.

FIGS. 13(a), 13(b) and 13(c) are similar to FIGS. 7(a), 7(b) and 7(c) for Example 3.

FIG. 15 is similar to FIG. 6 for Example 4.

FIGS. 16(a), 16(b) and 16(c) are similar to FIGS. 7(a), 7(b) and 7(c) for Example 4.

DESCRIPTION OF THE PREFERRED EMBODIMENTS

Why the aforesaid arrangement is used in the invention, and how it works is now explained.

Figure 1A:
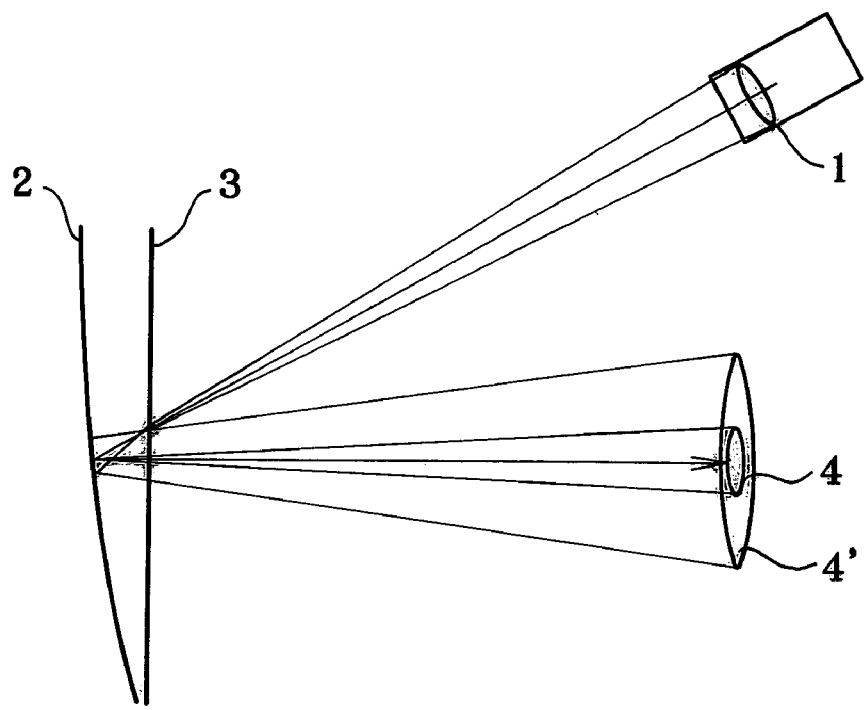
FIG. 1(a) is a schematic optical path diagram for one projection optical system in the projection optical apparatus constructed according to the invention.
Figure 1B:
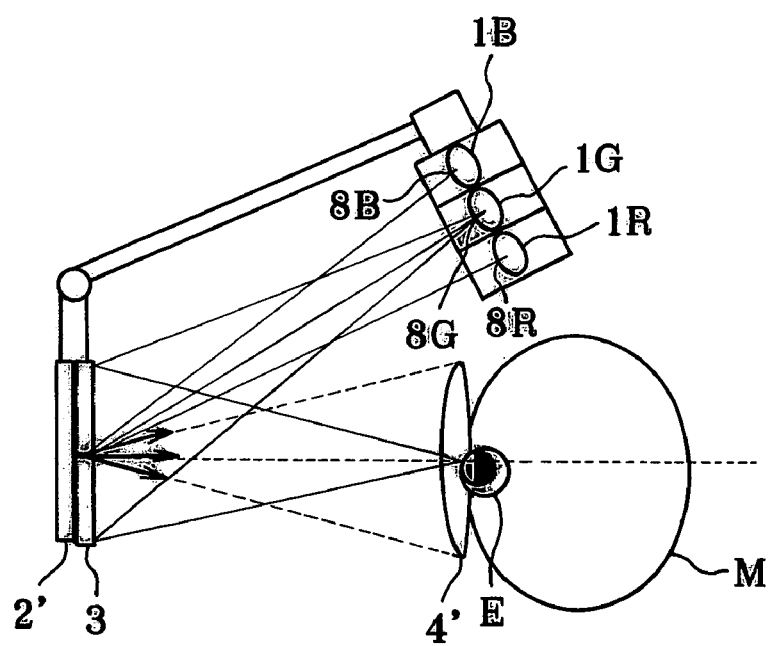
FIG. 1(b) is illustrative of a specific arrangement of the projection optical apparatus constructed according to the invention.

FIG. 1(a) is a schematic optical path diagram for one projection optical system 1 in the projection optical apparatus constructed according to the invention, and FIG. 1(b) is illustrative of a specific arrangement of the projection optical apparatus constructed according to the invention. In FIG. 1(b), a concave mirror 2 is defined by a Fresnel concave refracting mirror 2'. It is noted that the display device and illumination light source for projection optical system 1, 1R, 1G, 1B are not shown. As depicted in FIG. 1(a), an image appearing on the display device (including an image formed by deflection and scanning by scanning means of a light beam from a light source) is magnified and projected through the projection optical system 1. In the vicinity of the projected image, there are located a diffusing plate 3 and a concave mirror 2 forming part of an eyepiece optical system. The diffusing plate 3 comprises a transmission hologram. The concave mirror 2 projects the exit pupil of the projection optical system 1 at a given position as an exit pupil image 4. That given position is substantially in alignment with the eyeball E of a viewer M, as depicted in FIG. 1(b). The exit pupil image 4 formed through the concave mirror 2 in the projection optical system 1 is magnified through the diffusing plate 3 to an exit pupil image 4' of easy-to-observe size. It is thus possible for the viewer M to view the projected image as an image under observation even when the eye E of the viewer M is more or less displaced from the exit pupil 15 image 4. As a result, it is possible to achieve a fast, easy-to-observe projection optical apparatus.

However, it is appreciated that the diffusing plate 3, because of comprising a hologram, has chromatic dispersion. Accordingly, varying wavelengths cause changes in the angle of diffusion (the angle of diffraction), causing the position of the magnified exit pupil image 4' to displace vertically in the case of FIG. 1(a) depending on wavelength. Therefore, for displaying a color image, such an arrangement as shown typically in FIG. 1(b) is used as the projection optical system. In FIG. 1(b), three projection optical systems 1R, 1G, 1B for displaying images separated into R (red), G (green) and B (blue) are used. Here, the projection optical systems 1R, 1G and 1B are arranged in such a tandem fashion that the angle of incidence of projection light onto the concave mirror 2 varies and the respective projected images overlap one another on the diffusing plate 3. This arrangement makes compensation for the chromatic dispersion due to the diffusing plate 3, and allows the positions of the exit pupil images 4' magnified through the projection optical systems 1R, 1G and 1B to overlap one another, as will be more specifically described later.

According to one feature of the invention, the diffusing plate 3 is located on the entrance side of the concave mirror 2 forming part of the eyepiece optical system, as shown in FIG. 1(a). Combined with another feature of the invention that the diffusing plate 3 is a transmission hologram, this arrangement causes light rays propagating from the projection optical system 1 to the position of the exit pupil 4' to make a total of two roundtrip transmissions through the diffusing plate 3. In other words, the light is diffracted twice through the diffusing plate 3. On the basis of this, the angle of the first transmission (before incidence on the concave mirror 2) of light through the diffusing plate 3 is intentionally allowed to differ from the angle of the second transmission (after incidence on the concave mirror 2) of light through the hologram diffusing plate 3, thereby preventing light from being diffracted only once depending on the angle selectivity of the diffusing plate 3 (the hologram). The arrangement for this will be described later.

Preferably, the diffusing plate 3 should have an angle of diffusion of up to 20° at full width half maximum. As the angle of diffusion of the diffusing plate 3 at full width half maximum is greater than 20°, the angle of diffusion becomes too large. In this case, the image under observation becomes dark although the viewing field becomes large. This also causes an increase in the bulkiness of an illumination device for illuminating the object to be observed. More preferably, the diffusing plate 3 should have an angle of diffusion of at least 10° at full width half maximum. It is thus possible to obtain an easy-to-observe projection optical apparatus.

Moreover, the diffusibility of the diffusing plate 3 should preferably be such that the angle of diffusion is preferably up to 40° and more preferably up to 30° at a 1/10 full width.

For observing a stereoscopic image, the diffusing plate 3 should preferably have an angle of diffusion of up to 8° at full width half maximum and an angle of diffusion of up to 12° at a 1/10 full width.

Figure 2A:
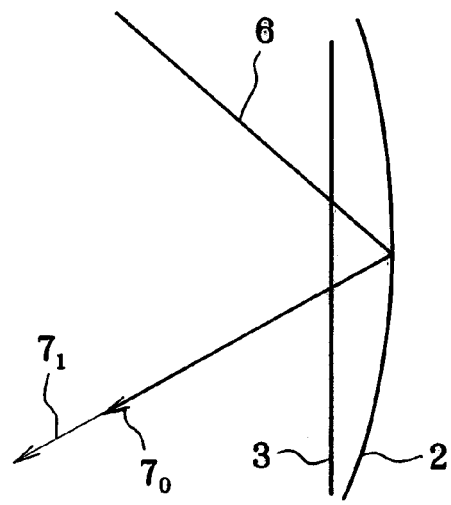
FIGS. 2(a), 2(b) and 2(c) are optical path diagrams for a combination of a diffusing plate comprising a transmission hologram through which light is flexed upon the first transmission with a concave mirror forming the eyepiece optical system.

Next, the relation between the bending and the chromatic dispersion of the diffusing plate 3, and the position relation between the concave mirror 2 forming part of the eyepiece optical system and the diffusing plate 3 is explained. The hologram diffusing plate 3 that is a hologram is fabricated by recording of interferences between reference light and object light from a diffusing light source (secondary light source). It is here supposed that reference light and object light are coaxially (in-line) positioned. Then, as shown in FIG. 2(a), an axial chief ray 6 from the projection optical system 1 is first incident on the diffusing plate 3, passing straightforward or without being bent through the diffusing plate 3. The chief ray passing straightforward through the diffusing plate 3 is reflected at the concave mirror 2, turning direction. The reflected chief ray enters the diffusing plate 3 from its back surface, passing straightforward through the diffusing plate 3. If, in this case, the angle of incidence of the incident light upon the first incidence satisfies the angle of incidence of reconstruction light of the hologram (the angle at which diffraction efficiency reaches substantially a peak), then diffused light by diffraction is distributed around the chief ray passing straightforward at the first transmission. Upon the second transmission, the diffused light passes substantially straightforward through the diffusing plate. On the other hand, if, upon the second incidence, the angle of incidence of the incident light satisfies the angle of incidence of the reconstruction light, then the axial chief ray 6 passes substantially straightforward or without being diffracted through the diffusing plate 3 upon the first transmission. Upon the second transmission, diffused light by diffraction is distributed around the chief ray passing straightforward through the diffusing plate 3. In any case, zero-order light $7_0$ and chief ray $7_1$ propagate in the same direction, as shown in FIG. 2(a), in which no diffused light is shown. In FIG. 2(a), only zero-order light $7_0$ not diffracted through the diffusing plate 3 and only a chief ray (center ray) $7_1$ in the diffused light by diffraction are shown. In FIG. 2(a), the zero-order light $7_0$ and chief ray $7_1$ propagate in the same direction, arriving at the center of the exit pupil 4' of the apparatus. Therefore, when the diffusing plate 3 has only a diffusing action and has not any optical-path bending action as shown in FIG. 2(a), not only the diffused light but also the zero-order light $7_0$ not diffused by diffraction arrives at the exit pupil 4'. This is not preferable because the spot of zero-order light $7_0$ appears at the center of an image under observation.

Figure 2B:
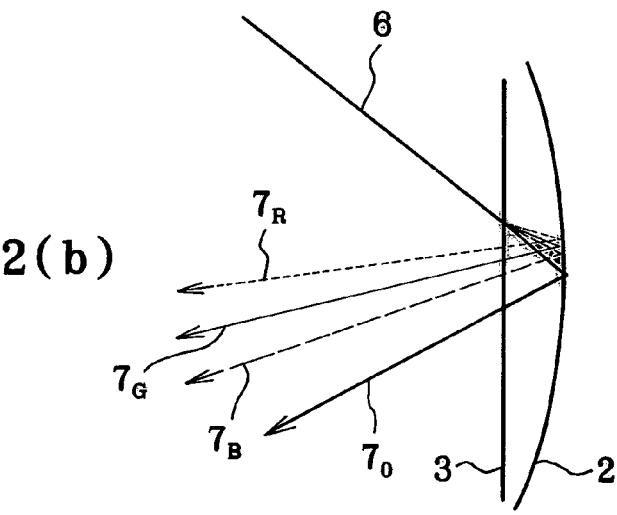
Figure 2C:
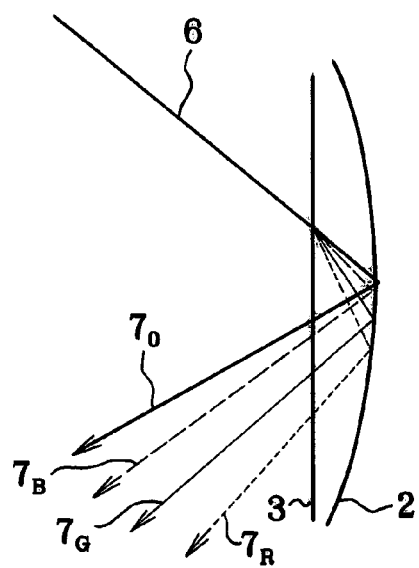
Figure 3A:
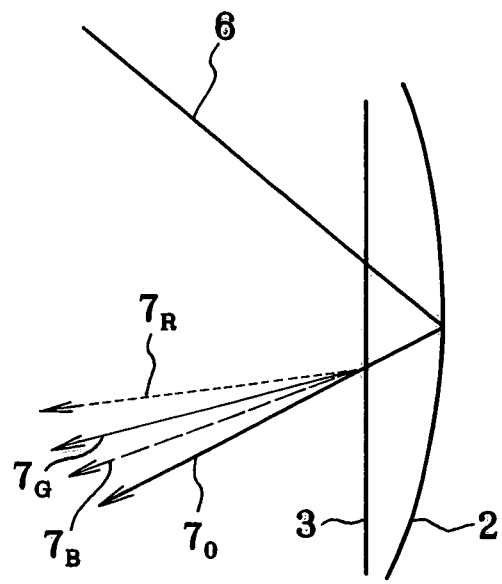
FIGS. 3(a) and 3(b) are optical path diagrams for a combination of a diffusing plate comprising a transmission hologram through which light is flexed upon the second transmission with a concave mirror forming the eyepiece optical system.
Figure 3B:
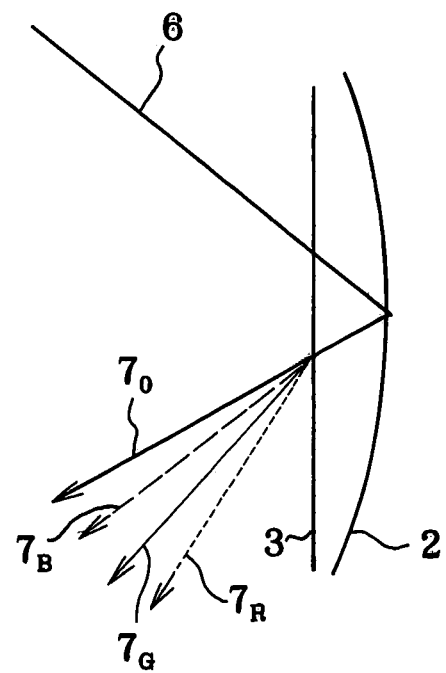

Therefore, a diffusing plate obtained by recording of interferences between reference light and object light in an off-line relation, viz., in a mutually uncoaxial relation is used as the diffusing plate 3. When light that satisfies the angle of incidence of reconstruction light is diffracted through the diffusing plate 3 obtained in such an off-line relation, the bending of light rays occurs with chromatic dispersion. Such optical paths as shown in FIGS. 2(b) and 2(c) and such optical paths as shown in FIGS. 3(a) and 3(b) are taken depending on the direction of that bending. However, it is noted that in FIGS. 2(b) and 2(c), the condition regarding the angle of incidence of reconstruction light for the diffusing plate 3 is satisfied upon the first incidence, and in FIGS. 3(a) and 3(b), that condition is satisfied upon the second incidence. In FIG. 2(b) and FIG. 3(a), the direction of bending of light through the diffusing plate 3 is such that the angle of diffraction becomes small with respect to the angle of incidence to the normal to the diffusing plate 3, and in FIG. 2(c) and FIG. 3(b), that direction is such that the angle of diffraction becomes large with respect to the angle of incidence. In these figures, no diffused light is shown. Chief rays (center rays) of R, G and B wavelengths diffracted and flexed through the diffusing plate 3 are indicated by $7_R$, $7_G$ and $7_B$. When the transmission hologram having a light ray bending action is used as the diffusing plate 3, zero-order light $7_0$ not diffracted through the hologram can then be separated from diffracted light $7_R$, $7_G$ and $7_B$, as can be seen from FIGS. 2 and 3, thereby ensuring that the zero-order light be not incident on the exit pupil 4' of the apparatus. Specifically, it is desired that the zero-order light $7_0$ be incident on a position away from the center of the exit pupil 4' by at least ½ of the pupil diameter.

Here, the angle of bending (deflection) of light through the transmission hologram is defined by the absolute value γ of a difference between the angle of incidence and the angle of diffraction, as measured at a d-line (of 587.6 nm wavelength). As the angle of bending γ is too small, the zero-order light will be entered in the image under observation, as described above. Conversely, as the angle of bending is too large, the spaces between the projection optical systems 1R, 1G and 1B located for compensation of chromatic dispersion will become too large. As a result, the difference in distortion (tilt distortion) between the R, G and B projected images on the diffusing plate 3 will become too large, making it difficult to observe normal color images.

Accordingly, the angle of bending (deflection) γ at d-line through the diffusing plate 3 should preferably satisfy the following condition.

$$γ>1°\quad(1)$$

More preferably, $$γ>2°\quad(1\text{---}1)$$

Even more preferably, $$γ>10°\quad(1\text{-}2)$$

On the other hand, it is also preferable to satisfy the following condition:

$$γ<45°\quad(2)$$

More preferably, $$γ<20°\quad(2\text{-}1)$$

Combining the above condition (1-2) with condition (2-1) results in the following condition (3).

$$10°<γ<20°\quad(3)$$

Condition (3) is further explained. As the lower limit of 10° to this condition (3) is not reached, the zero-order light is less separable from normal viewing light enabling images under observation to be viewed. For this reason, as the viewer moves its head slightly, the glare of the zero-order light often enters his eye. As the upper limit of 20° is exceeded, the difference in distortion between the R, G and B projected images on the diffusing plate 3 will become too large, rendering it difficult to observe normal color images.

In FIGS. 2 and 3, the axial chief ray 6 from the projection optical system 1 or the zero-order light $7_0$ is assumed to be obliquely incident on the concave mirror 2 (at an angle β with respect to the normal at the entrance position of the concave mirror 2). Suppose here that the axial chief rays 6 or the zero-order light $7_0$ is incident at substantial right angles (β≈0°) on the concave mirror 2. Then, the chief rays $7_R$, $7_G$ and $7_B$ leaving the hologram after passed twice through the diffusing plate 3 travel in a substantially opposite direction to the axial chief ray 6. This results in interference of the position of the exit pupil 4' of the apparatus with the projection optical system 1. Accordingly, the angle of incidence β (d-line) of the axial chief ray 6 from the projection optical system 1 or the zero-order light $7_0$ on the concave mirror 2 should preferably satisfy the following condition.

$$0°<β<45°\quad(4)$$

More preferably, $$5°<β<20°\quad(4\text{-}1)$$

This condition (4-1) is further explained. As the lower limit of 5° to this condition is not reached, the amount of decentration of the concave mirror 2 becomes small, resulting in conjugate reconstruction at the diffusing plate 3 and, hence, a decrease in the quantity of light that can be utilized for observation of displayed images. As the upper limit of 20° to this condition is exceeded, the amount of decentration of the concave mirror 2 becomes too large, resulting in an increase in projected pupil aberration and rendering it difficult to view images of uniform brightness.

Figure 4A:
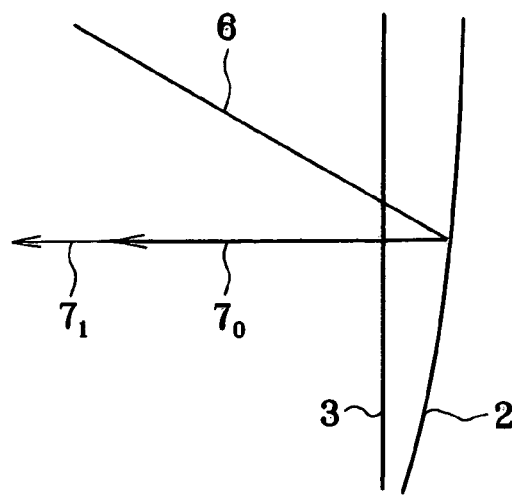
FIGS. 4(a), 4(b) and 4(c) are optical path diagrams for a combination of a diffusing plate comprising a transmission hologram through which light is flexed upon the first transmission with a decentered concave mirror forming the eyepiece optical system, corresponding to FIGS. 2(a), 2(b) and 2(c).
Figure 4B:
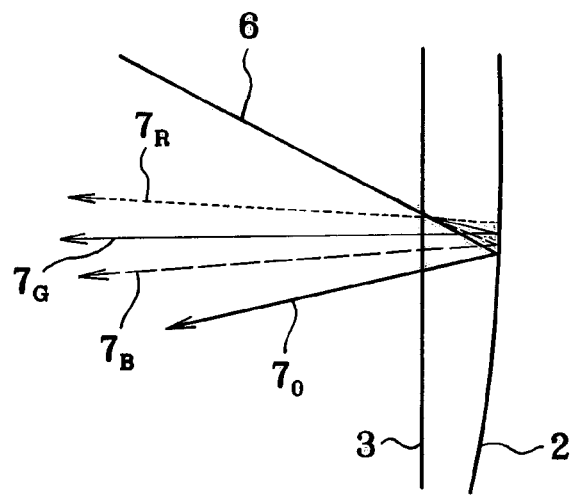
Figure 4C:
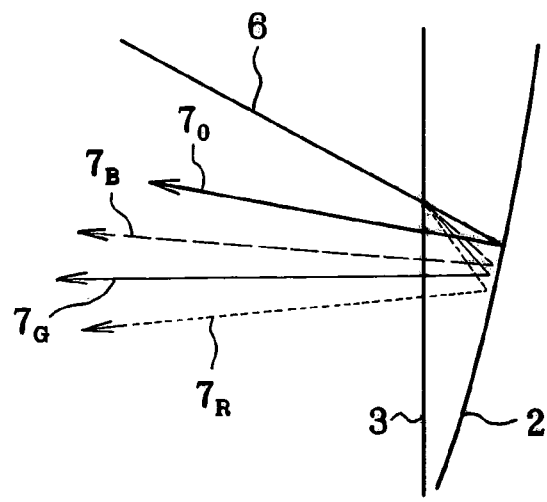

In FIGS. 2 and 3, the axial chief ray 6 from the projection optical system 1 is assumed to be incident on substantial centers of the diffusing plate 3 and the concave mirror 2 on the back surface side, and there is assumed to be no decentration between the diffusing plate 3 and the concave mirror 2. As can be seen from FIGS. 2 and 3, the projected (diffracted) light $7_R$, $7_G$ and $7_B$ passed twice through the diffusing plate 3 are at angles with respect to the normal to the diffusing plate 3, and the exit pupil 4' of the apparatus is not positioned on the front of the diffusing plate 3. With the position of the eyeball of the viewer brought in alignment with the position of the exit pupil 4' in this state, the viewer would view images projected from an oblique direction; the image under observation would become a tilted image leading to an image distortion. To avoid this, the concave mirror 3 is decentered (e.g., upward) with respect to the diffusing plate 3, as shown in FIGS. 4(a), 4(b) and 4(c), so that the chief rays $7_R$, $7_G$ and $7_B$ reflected at the concave mirror 2 are at substantially right angles with the diffusing plate 3 after the second transmission through the diffusing plate 3. It is noted that FIGS. 4(a), 4(b) and 4(c) correspond to FIGS. 2(a), 2(b) and 2(c), respectively.

As can be seen from FIGS. 2–4, when a single projection optical system 1 is used, the chief rays $7_R$, $7_G$ and $7_B$ of R, G and B wavelengths leave the diffusing plate 3 and the concave mirror 2 at different angles, because of the chromatic dispersion of the transmission hologram of which the diffusing plate 3 is formed. There are thus misalignments in the positions of the exit pupil images 4' magnified at the respective wavelengths. Consequently, normal color reproducibility will not be obtained or the range of the exit pupil, wherein color images can be observed with normal color reproducibility, will become narrow. To avoid this, three projection optical systems 1R, 1G and 1B for displaying images separated to individual colors R, G and B are used as already described. These projection optical systems 1R, 1G and 1B are located in such a tandem way that the angle of incidence of projection light on the concave mirror 2 varies and the projected images on the diffusing plate 3 overlap one another. This arrangement ensures that such chromatic dispersion due to the diffusing plate 3 can be compensated for and the positions of the exit pupil images 4' magnified through the projection optical systems 1R, 1G and 1B can overlap one another.

Referring more specifically to FIG. 2(b), FIG. 3(a) and FIG. 4(b), the projection optical system 1R for the projection of an image separated to color R, the projection optical system 1G for the projection of an image separated to color G and the projection optical system 1B for the projection of an image separated to color B are arranged in a tandem fashion in order from above, whereby the chief rays $7_R$ and $7_B$ of wavelengths R, B can be placed in alignment with the position of the chief ray $7_G$ of wavelength G. Consequently, consistent, widely magnified exit pupil images 4' can be obtained at all wavelengths. Referring then to FIG. 2(c), FIG. 3(b) and FIG. 4(c), contrary to the above, the projection optical system 1B for the projection of an image separated to color B, the projection optical system 1G for the projection of an image separated to color G and the projection optical system 1R for the projection of an image separated to color R are arranged in a tandem fashion in order from above, whereby the chief rays $7_R$ and $7_B$ of wavelengths R, B can be placed in alignment with the position of the chief ray $7_G$ of wavelength G. Consequently, consistent, widely magnified exit pupil images 4' can be obtained at all wavelengths.

It should be understood that since the projected images are projected from the projection optical systems 1, 1R, 1G, 1B obliquely onto the diffusing plate 3, the projected images on the diffusing plate 3, too, become tilted images leading to an image distortion. It is thus preferable to use as the projection optical systems 1, 1R, 1G, 1B those having a function to correct such a tilted image leading to an image distortion.

The exit pupil 4' of the apparatus is positioned on the front of the diffusing plate 3, and the axial chief rays 6 from the projection optical systems 1, 1R, 1G, 1B or the zero-order light $7_0$ is allowed to be obliquely incident on the concave mirror 3, so that surface specular light providing noise light can be prevented from entering the exit pupil 4' of the apparatus. This noise light occurs from the reflection at the surface of the diffusing plate 3 of the projection light from the projection optical systems 1, 1R, 1G, 1B.

The ratio γ/β between the above angle of bending (deflection) and the angle of incidence of light on the concave surface 2 should preferably satisfy the following condition.

$$0.5 < \gamma/\beta < 2 \quad (5)$$

This condition (5) is further explained. As the lower limit of 0.5 to this condition is not reached, the angle of bending of light through the transmission plate 3 becomes small. This would cause the zero-order light not diffracted through the transmission plate 3 to enter the exit pupil 4' of the apparatus, resulting in spot flares appearing on an image under observation. As the upper limit of 2 is exceeded, the amount of decentration of the concave mirror 2 becomes relatively small. In addition, there is an undesired light ray that, upon incidence on the diffusing plate 3, is reflected at the concave mirror 2, then Fresnel reflected, if slight, at the back surface of the diffusing plate 3, and again reflected at the concave mirror 2. This light ray is not preferable because it would enter the exit pupil 4', and then be viewed as a spot flare.

Even more preferably in view of prevention of spot flares, $$1 < \gamma/\beta < 1.5 \quad (5-1)$$

When the diffusing plate 3 is used, it is desired to use LEDs or LDs of high chromaticity for light sources for illuminating the display devices or light sources to generate the light beams to be incident on the scanning means.

Next, the projection optical apparatus of the invention is now explained with reference to Examples 1–4. Commonly throughout the examples, the concave mirror 2 acts to magnify and project the exit pupils of the projection optical systems 1R, 1G and 1B, and combines with the diffusing plate 3 to form an optical system. The concave mirror 2 is made up of a Fresnel concave reflecting mirror 2'. In each example, ray tracing for the construction parameters to be described later is carried out in the form of forward ray tracing (at 587.6 nm wavelength) from the center of the exit pupil 8G of the projection optical system 1G to the exit pupil 4' of the apparatus provided that the object plane is defined by the exit pupil 8G of the centrally located projection optical system 1G and the image plane is defined by the exit pupil 4' of the apparatus (that is a magnified exit pupil image of the exit pupil 4).

EXAMPLE 1

Figure 5:
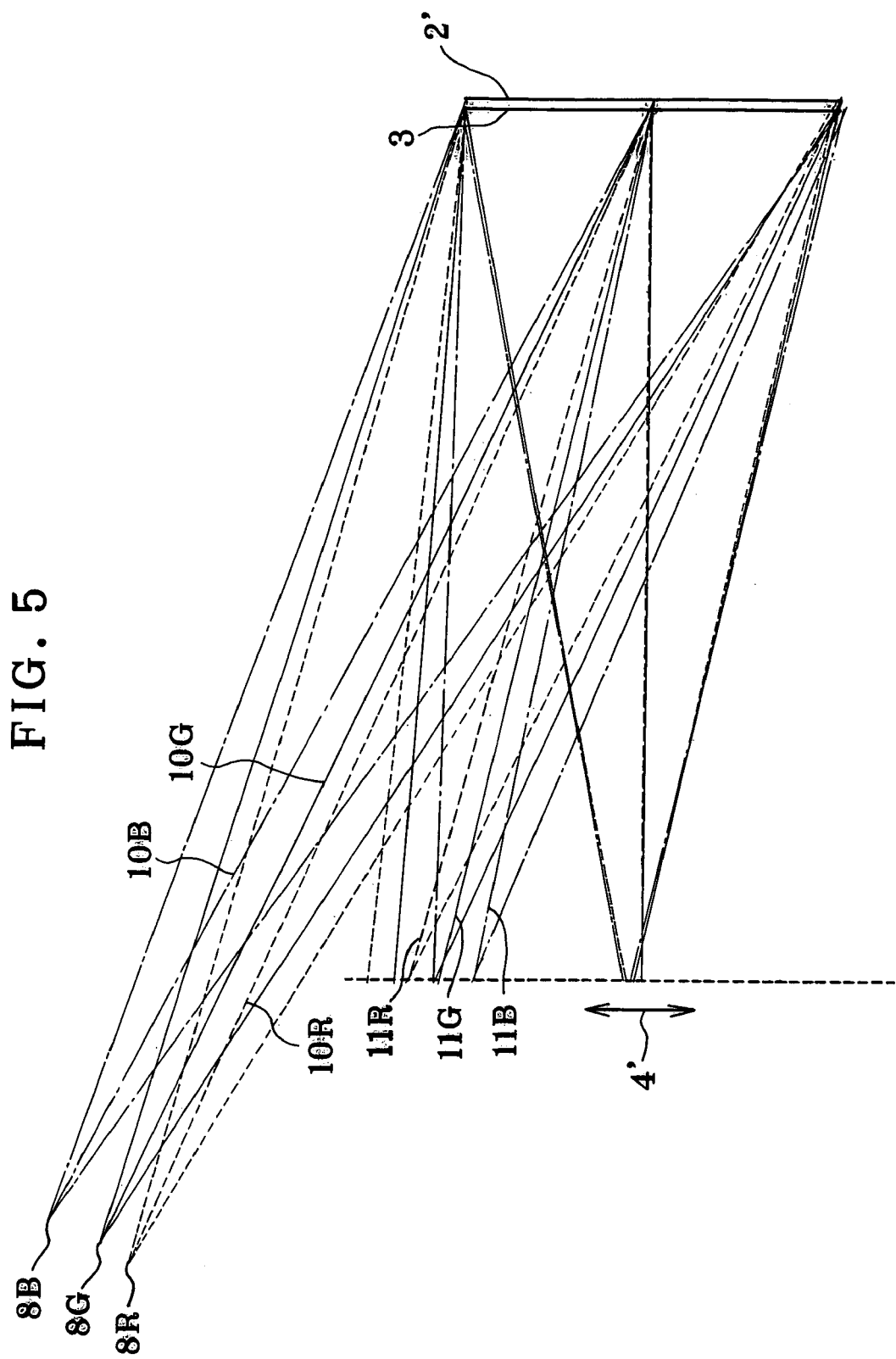
FIG. 5 is an optical path diagram illustrative in Y-Z section of Example 1 of the invention, simultaneously showing optical paths for zero-order light at the respective wavelengths.
Figure 6:
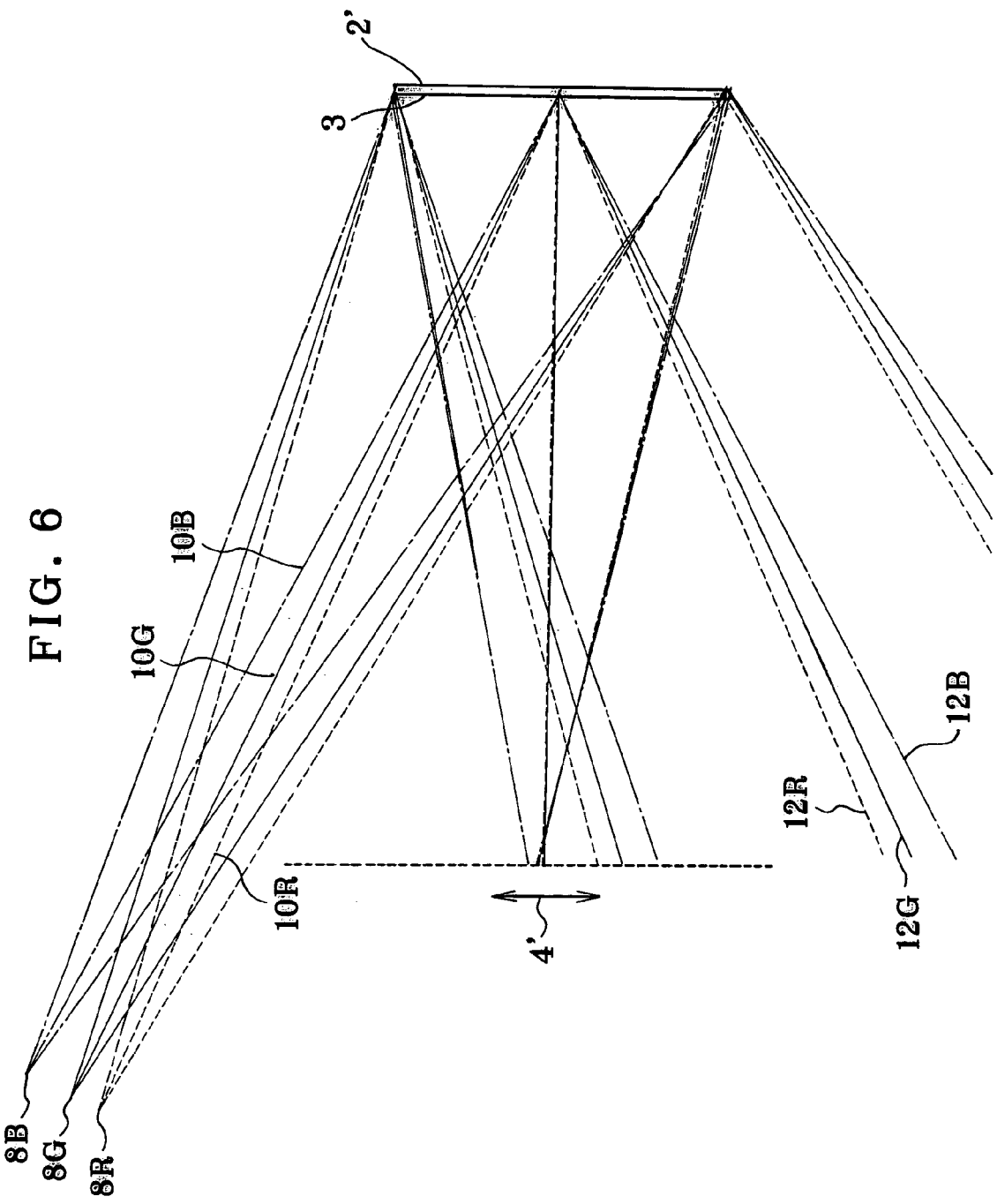
FIG. 6 is an optical path diagram illustrative in Y-Z section of Example 1 of the invention, simultaneously showing optical paths for specularly reflected light at the respective wavelengths.

Optical path diagrams in Y-Z section for this example are shown in FIGS. 5 and 6. FIGS. 5 and 6 are illustrative of how light rays from the respective exit pupils 8R, 8G and 8B of the projection optical systems 1R, 1G and 1B to the image plane behave; FIG. 5 is illustrative of how zero-order light 11R, 11G and 11B at the respective wavelengths behave, and FIG. 6 is illustrative of how specularly reflected light 12R, 12G and 12B behave. FIG. 7 is illustrative of how to record a transmission hologram used herein for the diffusing plate 3, with numerals given in mm unit.

In Example 1 corresponding to FIG. 2(c), the condition for the angle of incidence of reconstruction light is satisfied upon the first incidence, no diffraction occurs upon the second incidence, and the direction of bending of light rays is such that the angle of diffraction becomes large with respect to the angle of incidence to a normal to the surface of the diffusing plate 3. The Fresnel concave reflecting surface 2' is made up of a Fresnel back-surface mirror. Here let MY represent the amount of decentration of the Fresnel back-surface mirror, γ represent the angle of deflection of an axial chief ray 10G through the diffusing plate 3, and β represent the angle of incidence of the axial chief ray on the Fresnel concave reflecting mirror 2'. Then, MY=157.23 mm γ=15.00° (in a vitreous material having a refractive index of 1.4924)

β=12.57° (in a vitreous material having a refractive index of 1.4924)

γ/β=1.19

Set out below are the relations between θ that is the angles of incidence (decentration) of the axial chief rays 10R, 10G and 10B from the exit pupils 8R, 8G and 8B of the projection optical systems 1R, 1G and 1B, respectively, on the first surface (entrance side-plane of the diffusing plate 3) and 656.3 nm, 587.6 nm and 486.13 nm that are the wavelengths from the projection optical systems 1R, 1G and 1B, respectively.

| Wavelength | θ |
|---|---|
| 656.3 nm | 23.40° |
| 587.6 nm | 25.00° |
| 486.13 nm | 27.54° |

Exposure conditions for the transmission hologram used herein as the diffusing plate 3 are illustrated in FIG. 7(*a*). Referring here to a coordinate system for exposure, the origin is defined by the point of incidence of the axial chief ray 10G on the surface of the transmission hologram, the hologram surface is defined by an X-Y plane and a Z-axis is defined by a direction going away from the exit pupil 8G of the projection optical system 1G. At this time, hologram size is 190 mm×250 mm, as shown in FIG. 7(*b*). The first light source position (X1, Y1, Z1) for exposure is set as follows, provided that the light source is given by a point light source.

(X1, Y1, Z1)=(0, 297.11, −578.12)

The center position of the second light source (X2, Y2, Z2) is set as follows, provided that the second light source is given by a diffusing surface light source having an area of 86.67 mm×86.67 mm, as shown in FIG. 7(*c*).

(X2, Y2, Z2)=(0, 435.32, −482.72)

The transmission hologram fabricated under the above exposure conditions is used as the diffusing plate 3, whereby the light beam of each wavelength diffused through the diffusing plate 3 is reflected at the Fresnel concave reflecting mirror 2'. The range of the exit pupil where images can be viewed on the pupil surface of the viewer with high color reproducibility is then given by the magnified pupil 4' in a 60 mm×60 mm square shape, in which a circular pupil of ϕ60 is obtainable.

EXAMPLE 2

Optical path diagrams in Y-Z section for this example are shown in FIGS. 8 and 9. FIGS. 8 and 9 are illustrative of how light rays from the respective exit pupils 8R, 8G and 8B of the projection optical systems 1R, 1G and 1B to the image plane behave; FIG. 8 is illustrative of how zero-order light 11R, 11G and 11B at the respective wavelengths behave, and FIG. 9 is illustrative of how specularly reflected light 12R, 12G and 12B behave. FIG. 10 is illustrative of how to record a transmission hologram used herein for the diffusing plate 3, with numerals given in mm unit.

In Example 2 corresponding to FIG. 2(*b*), the condition for the angle of incidence of reconstruction light is satisfied upon the first incidence, no diffraction occurs upon the second incidence, and the direction of bending of light rays is such that the angle of diffraction becomes small with respect to the angle of incidence to a normal to the surface of the diffusing plate 3. The Fresnel concave reflecting surface 2' is made up of a Fresnel back-surface mirror. Here let MY represent the amount of decentration of the Fresnel back-surface mirror, γ represent the angle of deflection of the axial chief ray 10G through the diffusing plate 3, and β represent the angle of incidence of the axial chief ray on the Fresnel concave reflecting mirror 2'. Then, MY=43.23 mm γ=15.00° (in a vitreous material having a refractive index of 1.4924)

β=3.36° (in a vitreous material having a refractive index of 1.4924)

γ/β=4.46

Set out below are the relations between θ that is the angles of incidence (angles of decentration) of the axial chief rays 10R, 10G and 10B from the exit pupils 8R, 8G and 8B of the projection optical systems 1R, 1G and 1B, respectively, on the first surface (the entrance side-plane of the diffusing plate 3) and 656.3 nm, 587.6 nm and 486.13 nm that are the wavelengths from the projection optical systems 1R, 1G and 1B, respectively.

| Wavelength | θ |
|---|---|
| 656.3 nm | 26.82° |
| 587.6 nm | 25.00° |
| 486.13 nm | 22.37° |

Exposure conditions for the transmission hologram used herein as the diffusing plate 3 are illustrated in FIG. 10(*a*). Referring here to a coordinate system for exposure, the origin is defined by the point of incidence of the axial chief ray 10G on the surface of the transmission hologram, the hologram surface is defined by an X-Y plane and a Z-axis is defined by a direction going away from the exit pupil 8G of the projection optical system 1G. At this time, hologram size is 190 mm×250 mm, as shown in FIG. 10(*b*). The first light source position (X1, Y1, Z1) for exposure is set as follows, provided that the light source is given by a point light source.

(X1, Y1, Z1)=(0, 297.11, −578.12)

The center position of the second light source (X2, Y2, Z2) is set as follows, provided that the second light source is given by a diffusing surface light source having an area of 86.67 mm×86.67 mm, as shown in FIG. 10(*c*).

(X2, Y2, Z2)=(0, 136.36, −635.53)

The transmission hologram fabricated under the above exposure conditions is used as the diffusing plate 3, whereby the light beam of each wavelength diffused through the diffusing plate 3 is reflected at the Fresnel concave reflecting mirror 2'. The range of the exit pupil where images can be viewed on the pupil surface of the viewer with high color reproducibility is then given by the magnified pupil 4' in a 60 mm×60 mm square shape, in which a circular pupil of ϕ60 is obtainable.

EXAMPLE 3

Figure 11:
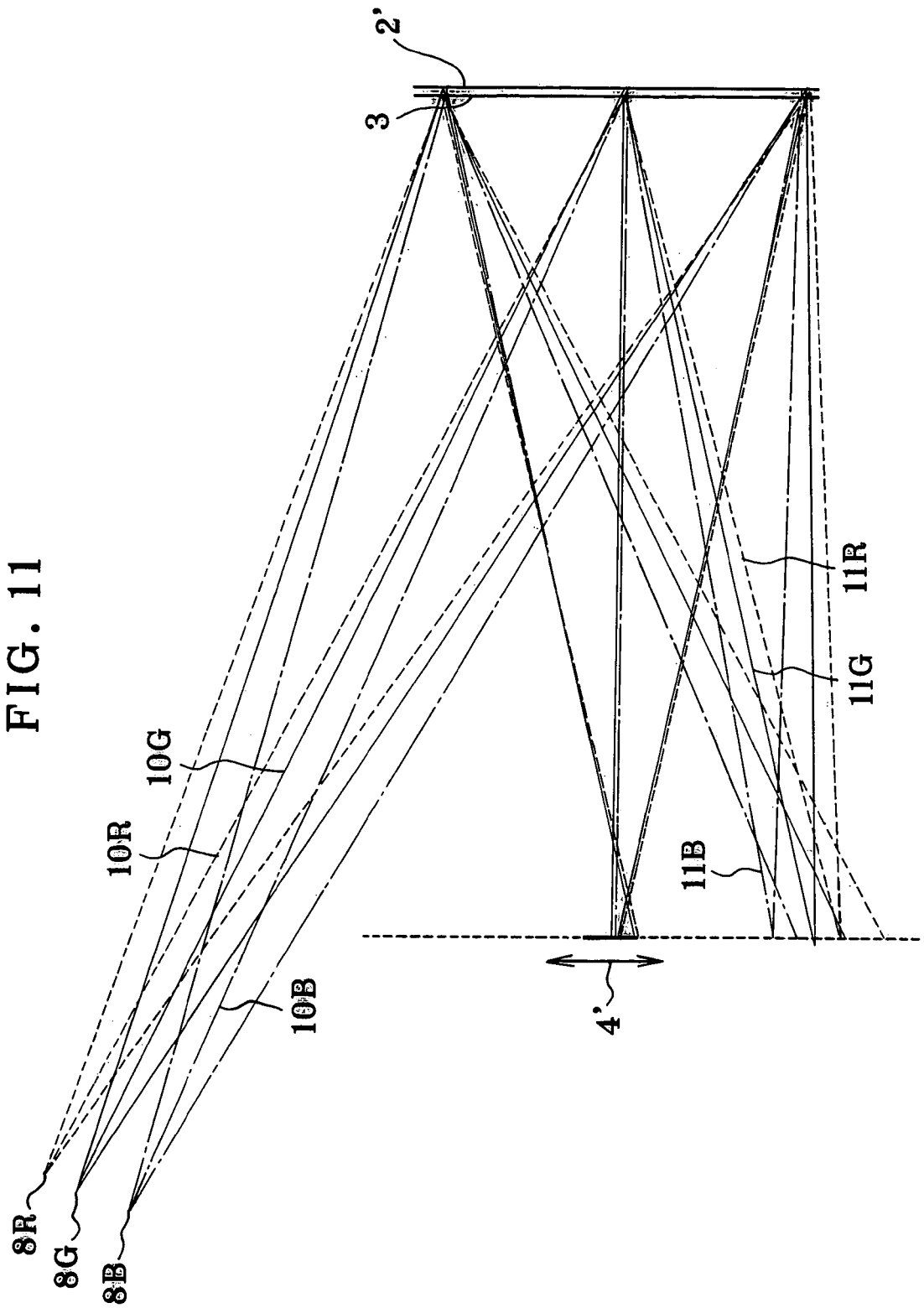
FIG. 11 is similar to FIG. 5 for Example 3.
Figure 12:
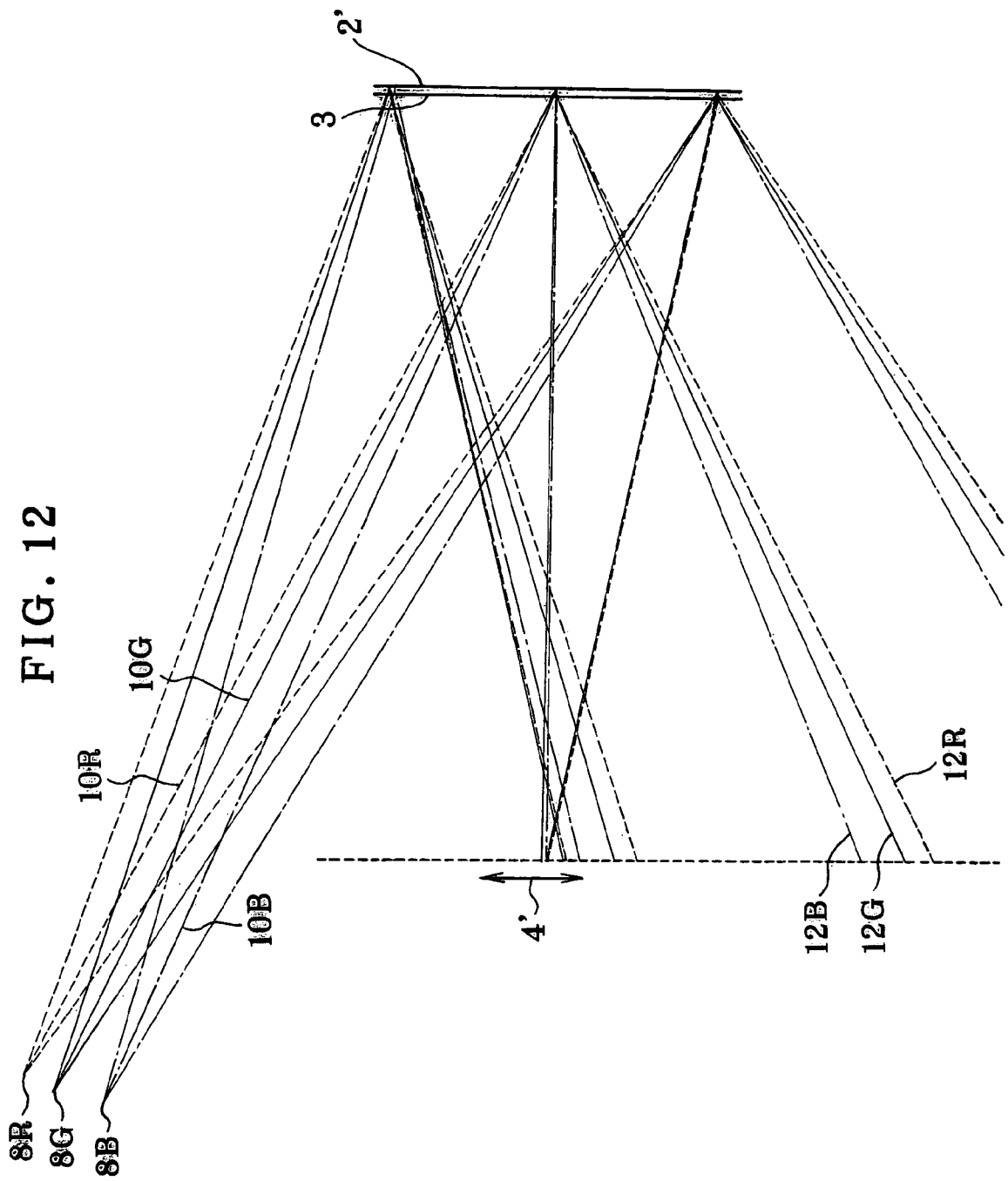
FIG. 12 is similar to FIG. 6 for Example 3.

Optical path diagrams in Y-Z section for this example are shown in FIGS. 11 and 12. FIGS. 11 and 12 are illustrative of how light rays from the respective exit pupils 8R, 8G and 8B of the projection optical systems 1R, 1G and 1B to the image plane behave; FIG. 11 is illustrative of how zero-order light 11R, 11G and 11B at the respective wavelengths behave, and FIG. 12 is illustrative of how specularly reflected light 12R, 12G and 12B behave. FIG. 13 is illustrative of how to record a transmission hologram used herein for the diffusing plate 3, with numerals given in mm unit.

In Example 3 corresponding to FIG. 3(a), the condition for the angle of incidence of reconstruction light is satisfied upon the second incidence, no diffraction occurs upon the first incidence, and the direction of bending of light rays is such that the angle of diffraction becomes small with respect to the angle of incidence to a normal to the surface of the diffusing plate 3. The Fresnel concave reflecting surface 2' is made up of a Fresnel back-surface mirror. Here let MY represent the amount of decentration of the Fresnel back-surface mirror, $\gamma$ represent the angle of deflection of an axial chief ray 10G through the diffusing plate 3, and $\beta$ represent the angle of incidence of the axial chief ray on the Fresnel concave reflecting mirror 2'. Then, MY=49.77 mm $\gamma$=12.30° (in a vitreous material having a refractive index of 1.4924)

$\beta$=12.60° (in a vitreous material having a refractive index of 1.4924)

$\gamma/\beta$=0.97

Set out below are the relations between $\theta$ that is the angles of incidence (decentration) of the axial chief rays 10R, 10G and 10B from the exit pupils 8R, 8G and 8B of the projection optical systems 1R, 1G and 1B, respectively, on the first surface (entrance side-plane of the diffusing plate 3) and 656.3 nm, 587.6 nm and 486.13 nm that are the wavelengths from the projection optical systems 1R, 1G and 1B, respectively.

| Wavelength | $\theta$ |
|---|---|
| 656.3 nm | 26.66° |
| 587.6 nm | 25.00° |
| 486.13 nm | 22.69° |

Exposure conditions for the transmission hologram used as the diffusing plate 3 herein are illustrated in FIG. 13(a). Referring here to a coordinate system for exposure, the origin is defined by the point of incidence of the axial chief ray 10G on the surface of the transmission hologram, the hologram surface is defined by an X-Y plane and a Z-axis is defined by a direction going away from the exit pupil 8G of the projection optical system 1G. At this time, hologram size is 190 mm×250 mm, as shown in FIG. 13(b). The first light source position (X1, Y1, Z1) for exposure is set as follows, provided that the light source is given by a point light source.

(X1, Y1, Z1)=(0, −96.13, −439.65)

The center position of the second light source (X2, Y2, Z2) is set as follows, provided that the second light source is given by a diffusing surface light source having an area of 60 mm×60 mm, as shown in FIG. 13(c).

(X2, Y2, Z2)=(0, 0, −450.00)

The transmission hologram fabricated under the above exposure conditions is used as the diffusing plate 3, whereby the light beam diffused through the diffusing plate 3 is reflected at the Fresnel concave reflecting mirror 2'. The range of the exit pupil where images can be viewed on the pupil surface of the viewer with high color reproducibility is then given by the magnified pupil 60 in a 60 mm×60 mm square shape, in which a circular pupil of $\phi$60 is obtainable.

EXAMPLE 4

Figure 14:
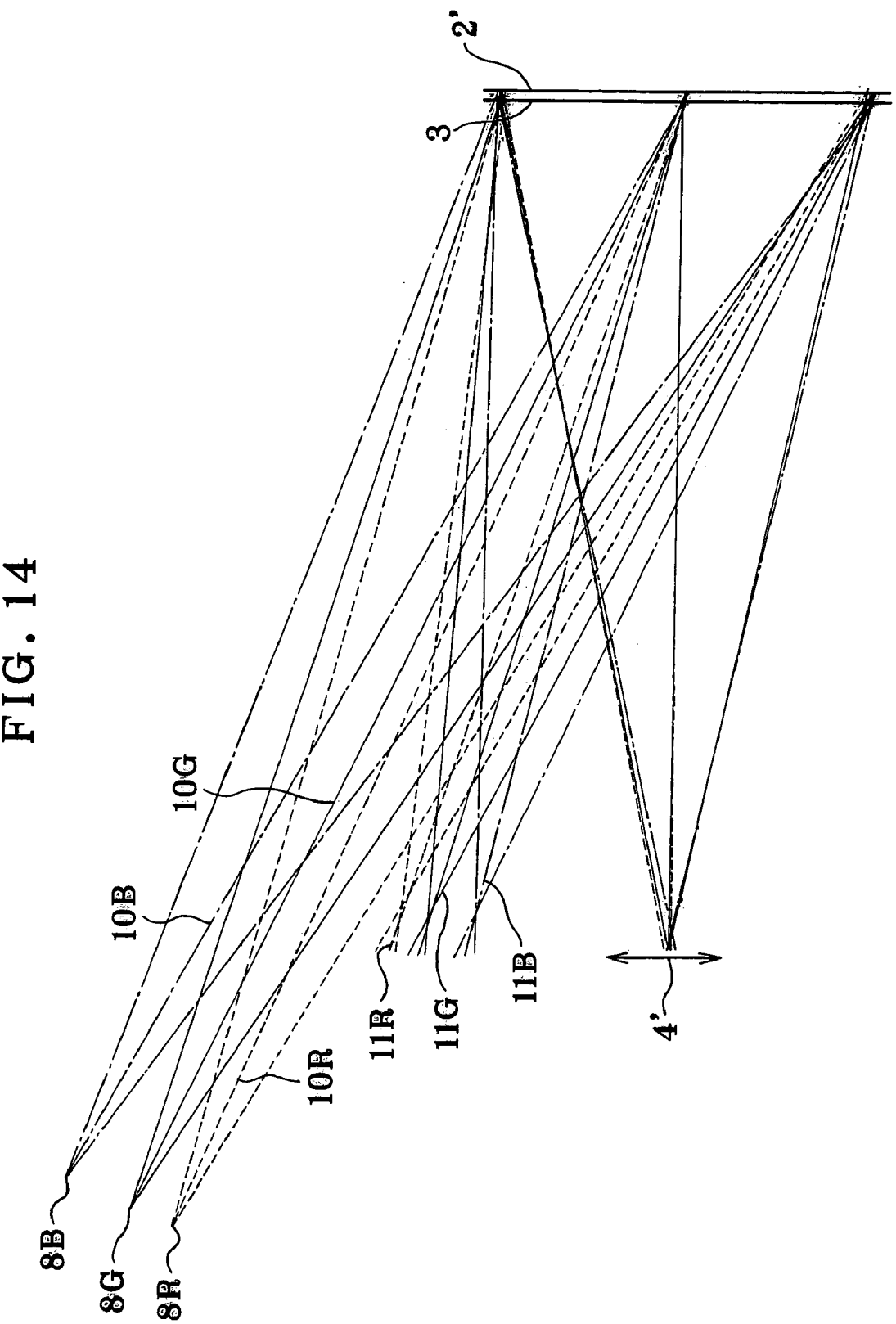
FIG. 14 is similar to FIG. 5 for Example 4.

Optical path diagrams in Y-Z section for this example are shown in FIGS. 14 and 15. FIGS. 14 and 15 are illustrative of how light rays from the respective exit pupils 8R, 8G and 8B of the projection optical systems 1R, 1G and 1B to the image plane behave; FIG. 14 is illustrative of how zero-order light 11R, 11G and 11B at the respective wavelengths behave, and FIG. 15 is illustrative of how specularly reflected light 12R, 12G and 12B behave. FIG. 16 is illustrative of how to record a transmission hologram used herein for the diffusing plate 3, with numerals given in mm unit.

In Example 4 corresponding to FIG. 3(b), the condition for the angle of incidence of reconstruction light is satisfied upon the second incidence, no diffraction occurs upon the first incidence, and the direction of bending of light rays is such that the angle of diffraction becomes large with respect to the angle of incidence to a normal to the surface of the diffusing plate 3. The Fresnel concave reflecting surface 2' is made up of a Fresnel back-surface mirror. Here let MY represent the amount of decentration of the Fresnel back-surface mirror, $\gamma$ represent the angle of deflection of the axial chief ray 10G through the diffusing plate 3, and $\beta$ represent the angle of incidence of the axial chief ray on the Fresnel concave reflecting mirror 2'. Then, MY=171.54 mm $\gamma$=15.00° (in a vitreous material having a refractive index of 1.4924)=

$\beta$=2.88° (in a vitreous material having a refractive index of 1.4924)

$\gamma/\beta$=5.21

Set out below are the relations between $\theta$ that is the angles of incidence (angles of decentration) of the axial chief rays 10R, 10G and 10B from the exit pupils 8R, 8G and 8B of the projection optical systems 1R, 1G and 1B, respectively, on the first surface (the entrance side-plane of the diffusing plate 3) and 656.3 nm, 587.6 nm and 486.13 nm that are the wavelengths from the projection optical systems 1R, 1G and 1B, respectively.

| Wavelength | $\theta$ |
|---|---|
| 656.3 nm | 23.04° |
| 587.6 nm | 25.00° |
| 486.13 nm | 28.24° |

Exposure conditions for the transmission hologram used herein as the diffusing plate 3 are illustrated in FIG. 16(a). Referring here to a coordinate system for exposure, the origin is defined by the point of incidence of the axial chief ray 10G on the surface of the transmission hologram, the hologram surface is defined by an X-Y plane and a Z-axis is defined by a direction going away from the exit pupil 8G of the projection optical system 1G. At this time, hologram size is 190 mm×250 mm, as shown in FIG. 16(b). The first light source position (X1, Y1, Z1) for exposure is set as follows, provided that the light source is given by a point light source.

(X1, Y1, Z1)=(0, 116.62, −434.63)

The center position of the second light source (X2, Y2, Z2) is set as follows, provided that the second light source is given by a diffusing surface light source having an area of 60 mm×60 mm, as shown in FIG. 16(*c*).

(X2, Y2, Z2)=(0, 0, −450.00)

The transmission hologram fabricated under the above exposure conditions is used as the diffusing plate 3, whereby the light beam of each wavelength diffused through the diffusing plate 3 is reflected at the Fresnel concave reflecting mirror 2'. The range of the exit pupil where images can be viewed on the pupil surface of the viewer with high color reproducibility is then given by the magnified pupil 60 in a 60 mm×60 mm square shape, in which a circular pupil of ϕ60 is obtainable.

Construction parameters in the above Examples 1–4 are set out below. As mentioned above, the axial chief ray 10G in Examples 1–4 is defined by a light ray that leaves the center of the exit pupil 8G of the projection optical system 10G and passes through the center of the diffusing plate 3, arriving at the center of the exit pupil 4' of the system. In forward ray tracing, the center of the exit pupil 8G of the projection optical system 1G is defined as the origin, the pupil plane as an X-Y plane, and the direction of propagation of the axial chief ray 10G vertical to the pupil as a Z-axis positive direction.

For the decentered surface, there are given the amount of decentration of its apex from the origin of the optical system and the angles of inclination of its center axis (for an aspheric surface, the Z-axis of the following formula (a)) around the X-, Y- and Z-axes (α, β, γ(°)) In that case, the positive for α and β means counterclockwise rotation with respect to the positive direction of the respective axes, and the positive for γ means clockwise rotation with respect to the positive direction of the Z-axis. For α, β and γ rotation of the center axis of the surface, the center axis of the surface and its XYZ orthogonal coordinate system are first counterclockwise rotated around the X-axis by α. Then, the center axis of the rotated surface is counterclockwise rotated around the Y-axis of a new coordinate system by β while the once rotated coordinate system is counterclockwise rotated around the Y-axis by β. Then, the center axis of the twice rotated surface is clockwise rotated around the Z-axis of a new coordinate system by γ.

The aspheric surface used herein is a rotationally symmetric aspheric surface given by the following defining formula:

$$Z=(Y^2/R)/[1+\{1-(1+K)Y^2/R^2\}^{1/2}]+AY^4+BY^6+CY^8+DY^{10}+ \quad (a)$$

where Z is an optical axis (axial chief ray) provided that the direction of propagation of light is positive, and Y is in the direction vertical to the optical axis. Here R is a paraxial radius of curvature, K is a conical constant, and A, B, C, D, ... are the 4th, 6th, 8th and 10th aspheric coefficients.

It is noted that the term regarding aspheric surfaces on which no data given is zero. Refractive indexes are given on a d-line basis (587.56 nm). Length is given in mm unit.

Construction parameters for Examples 1–4 are set out below. In what follows, "ASS", "FL", "RE", "HOE" and "PIM" represent an aspheric surface, a Fresnel surface, a reflecting surface, a transmission hologram and an image projection surface, respectively.

EXAMPLE 1

| Surface No. | Radius of curvature | Surface separation | Displacement and tilt | Refractive index | Abbe's No. |
|---|---|---|---|---|---|
| Object plane | ∞ | | | | |
| 1 | | HOE | (1) | 1.4924 | 57.6 |
| 2 | ∞ | (PIM) | (1) | 1.4924 | 57.6 |
| 3 | | ASS(1) (RE, FL) | (2) | 1.4924 | 57.6 |
| 4 | ∞ | | (1) | | |
| Image plane | ∞ | | (3) | | |

| ASS(1) |
|---|
| R −407.45 |
| K −5.8103 × 10 |
| A −7.5130 × 10$^{-7}$ |
| B 7.5802 × 10$^{-12}$ |
| C −3.1478 × 10$^{-17}$ |

Displacement and tilt(1)

| X | 0.00 | Y | 0.00 | Z | 650.00 |
|---|---|---|---|---|---|
| α | 25.00 | β | 0.00 | γ | 0.00 |

Displacement and tilt(2)

| X | 0.00 | Y | MY | Z | 577.79 |
|---|---|---|---|---|---|
| α | 25.00 | β | 0.00 | γ | 0.00 |

Displacement and tilt(3)

| X | 0.00 | Y | −190.18 | Z | 242.16 |
|---|---|---|---|---|---|
| α | 25.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | | | | |
| 1 | | HOE | (1) | 1.4924 | 57.6 |
| 2 | ∞ | (PIM) | (1) | 1.4924 | 57.6 |
| 3 | | ASS(1) (RE, FL) | (2) | 1.4924 | 57.6 |
| 4 | ∞ | | (1) | | |
| Image plane | ∞ | | (3) | | |

| ASS(1) |
|---|
| R −794.83 |
| K −5.3753 × 10 |
| A 1.0973 × 10$^{-6}$ |
| B 2.4736 × 10$^{-11}$ |
| C −2.7488 × 10$^{-16}$ |

Displacement and tilt(1)

| X | 0.00 | Y | 0.00 | Z | 650.00 |
|---|---|---|---|---|---|
| α | 25.00 | β | 0.00 | γ | 0.00 |

Displacement and tilt(2)

| X | 0.00 | Y | MY | Z | 630.94 |
|---|---|---|---|---|---|
| α | 25.00 | β | 0.00 | γ | 0.00 |

Displacement and tilt(3)

| X | 0.00 | Y | −190.18 | Z | 242.16 |
|---|---|---|---|---|---|
| α | 25.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | | | | |
| 1 | ∞ | (PIM) | (1) | 1.4924 | 57.6 |
| 2 | | ASS(1) (RE, FL) | (2) | 1.4924 | 57.6 |
| 3 | ∞ | | (1) | | |
| 4 | | HOE | (1) | 1.4924 | 57.6 |
| Image plane | ∞ | | (3) | | |

ASS(1)

R −792.61
K 0.0000
A $3.7000 \times 10^{-9}$
B $-2.3710 \times 10^{-13}$
C $5.4398 \times 10^{-18}$ Displacement and tilt(1)

| X | 0.00 | Y | 0.00 | Z | 650.00 |
|---|---|---|---|---|---|
| α | 25.00 | β | 0.00 | γ | 0.00 |

Displacement and tilt(2)

| X | 0.00 | Y | MY | Z | 627.89 |
|---|---|---|---|---|---|
| α | 25.00 | β | 0.00 | γ | 0.00 |

Displacement and tilt(3)

| X | 0.00 | Y | −190.18 | Z | 242.16 |
|---|---|---|---|---|---|
| α | 25.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | | | | |
| 1 | ∞ | (PIM) | (1) | 1.4924 | 57.6 |
| 2 | | ASS(1) (RE, FL) | (2) | 1.4924 | 57.6 |
| 3 | ∞ | | (1) | | |
| 4 | | HOE | (1) | 1.4924 | 57.6 |
| 像面 | ∞ | | (3) | | |

ASS(1)

R −763.19
K −2.3408
A $-1.8903 \times 10^{-8}$
B $1.4268 \times 10^{-13}$
C $-4.9692 \times 10^{-19}$ Displacement and tilt(1)

| X | 0.00 | Y | 0.00 | Z | 650.00 |
|---|---|---|---|---|---|
| α | 25.00 | β | 0.00 | γ | 0.00 |

Displacement and tilt(2)

| X | 0.00 | Y | MY | Z | 571.11 |
|---|---|---|---|---|---|
| α | 25.00 | β | 0.00 | γ | 0.00 |

Displacement and tilt(3)

| X | 0.00 | Y | −190.18 | Z | 242.16 |
|---|---|---|---|---|---|
| α | 25.00 | β | 0.00 | γ | 0.00 |

Next, specific embodiments wherein the projection optical apparatus of the invention is set up as a stereoscopic viewing system are explained.

Figure 17:
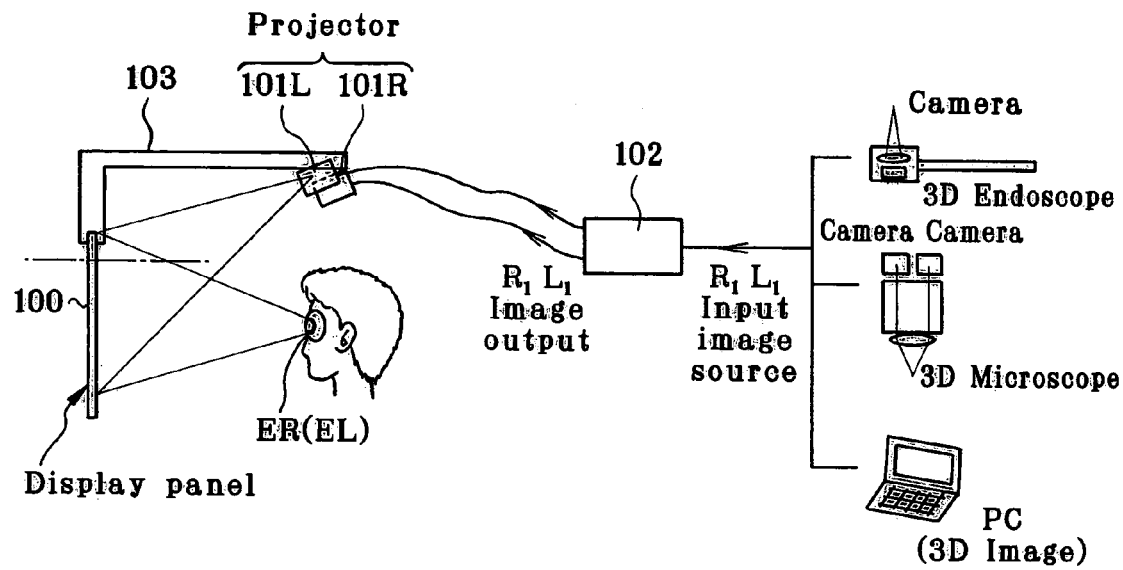
FIG. 17 is illustrative of one specific product incorporating the stereoscopic viewing system of the invention.

FIG. 17 is illustrative in schematic of one embodiment of the stereoscopic viewing system to which the invention is applicable. The system has such construction as described in each of the above examples. In the instant embodiment, one set of projection optical systems 1R, 1G and 1B for R, G and B is constructed in the form of a projector. One pair of such projectors 101L and 101R are provided to display binocular parallactic images thereon. The left and right projectors 101L and 101R are connected to a projector controller 102 that singles out images taken by a right and a left camera mounted on a stereoscopic (3D) image input device such as a stereoscopic (3D) endoscope or a stereoscopic (3D) microscope to send the selected images to the left and right projectors 101L and 101R for displaying purposes. Other selectable input images, for instance, include a personal computer-aided stereoscopic (3D) image having parallax. The projector controller 102 enables even such an image to be entered as an input image in a display panel 100. That is, the projector controller 102 is constructed such that such an image can be displayed on the projectors 101L and 101R. In this case, a panel comprising a concave mirror 2 or a Fresnel reflecting mirror 2' forming part of an eyepiece optical system and a diffusing plate 3 of a transmission hologram located on the front surface thereof, as described above, could be used as the display panel 100.

Next, products incorporating the stereoscopic viewing system according to the invention are explained.

Figure 18:
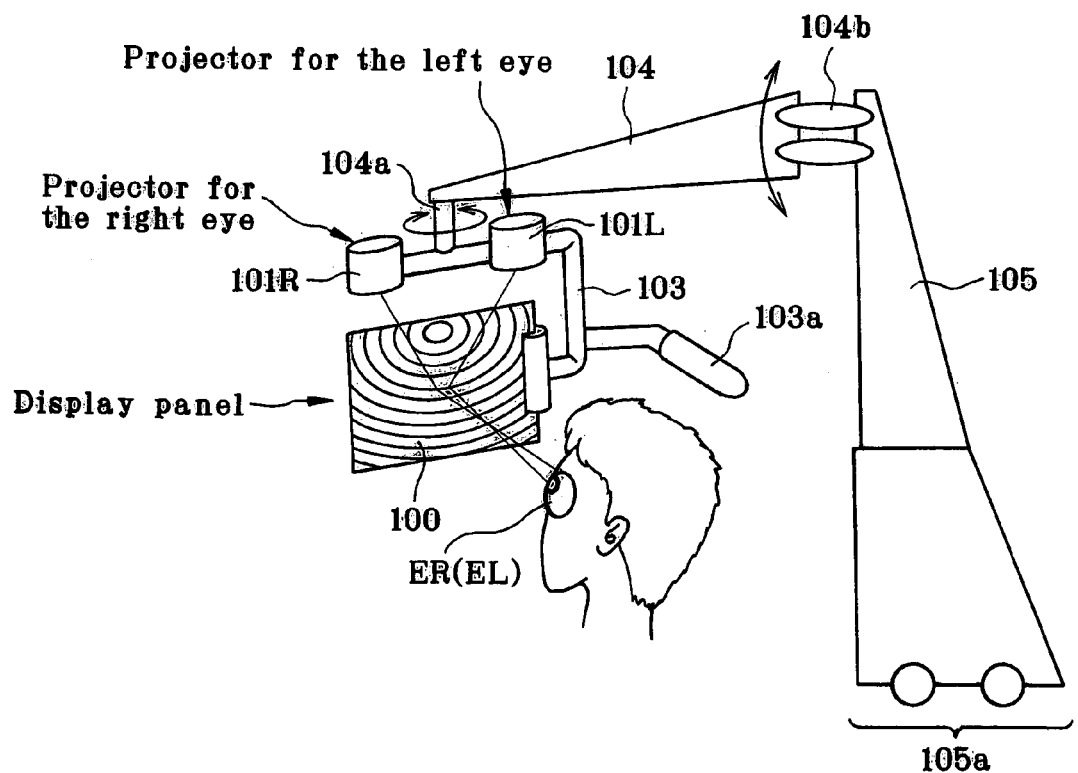
FIG. 18 is illustrative of another specific product incorporating the stereoscopic viewing system of the invention.

FIG. 18 is illustrative of one specific product incorporating the stereoscopic viewing system according to the invention, which is built up of a reflection type stereoscopic projection viewing system, a support arm 104 for supporting a holder 103 and a holder body 105 having a caster, which supports the support arm 104. The reflection type stereoscopic projection viewing system comprises a display panel 100 and left and right projectors 101L and 101R, all integrally mounted on the holder 103. In the reflection type stereoscopic viewing system, images having parallaxes are projected from the left and right projectors 101L and 101R. Then, the projected images are reflected at the display panel 100 to form the images on the left and right eyes EL and ER of a viewer while magnifying the pupils for observation.

The holder 103 is rotatable via a joint 104a of the support arm 104 in a direction indicated by an arrow. The support arm 104 is coupled to the support body 105 via a joint 104b in such a way as to be rotatable in the direction indicated by an arrow. Thus, the viewer can change his attitude by turning the holder 103 and support arm 104 in the desired direction. The holder 103 is also provided with a manipulator 103a that helps turn them in the desired direction.

The support body 105 is equipped with a caster 105a for moving the support body 105, so that the viewer can change his viewing position.

Figure 19:
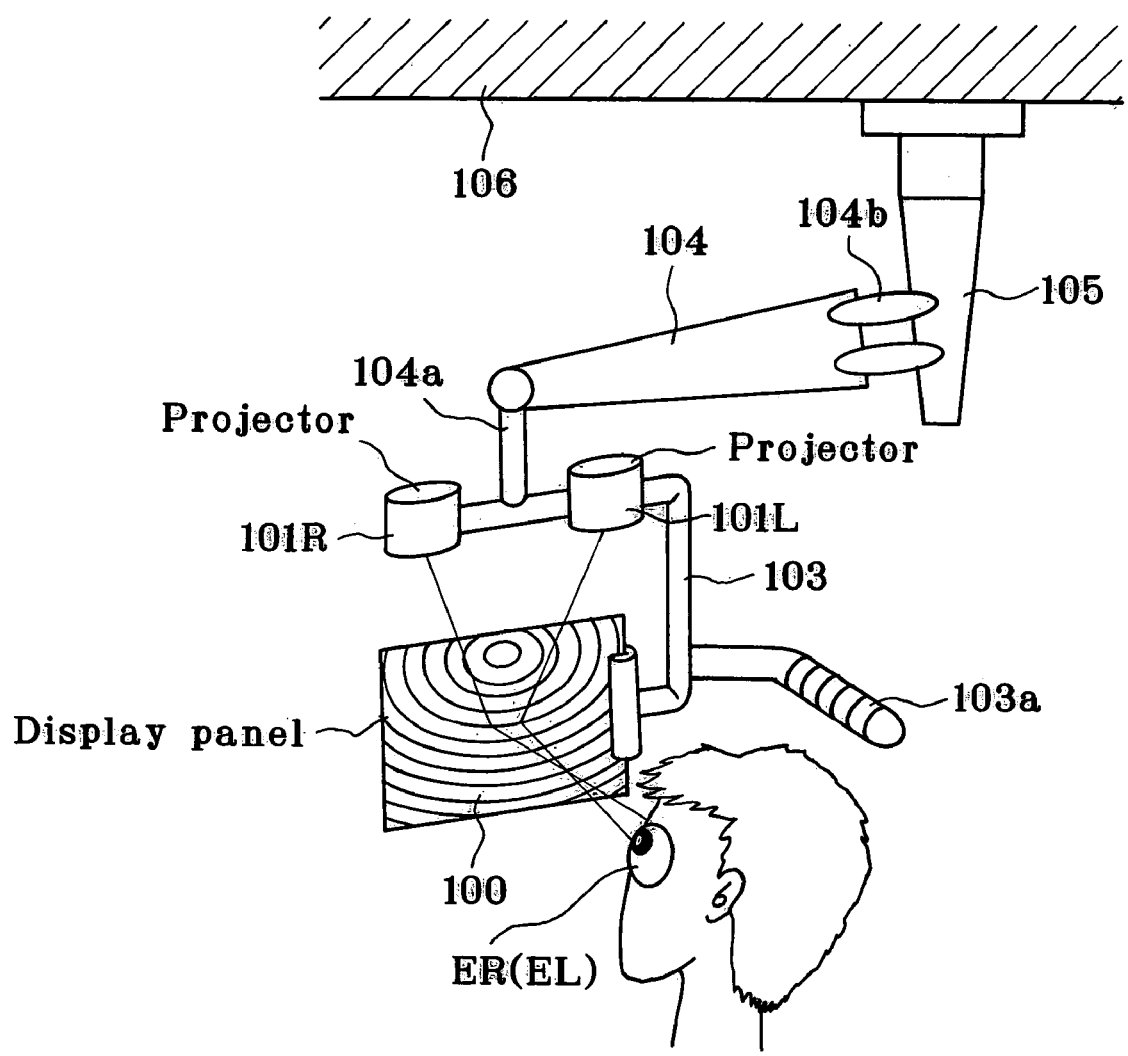
FIG. 19 is illustrative of yet another specific product incorporating the stereoscopic viewing system of the invention.

FIG. 19 is illustrative of another specific product incorporating the stereoscopic viewing system of the invention. In this product, too, a reflection type stereoscopic projection viewing system is held by a support arm 104, as shown in FIG. 18. However, a support body 105 for supporting the support art 104 is mounted to a ceiling 106. The instant product can save space for placing the stereoscopic projection viewing system.

Figure 20:
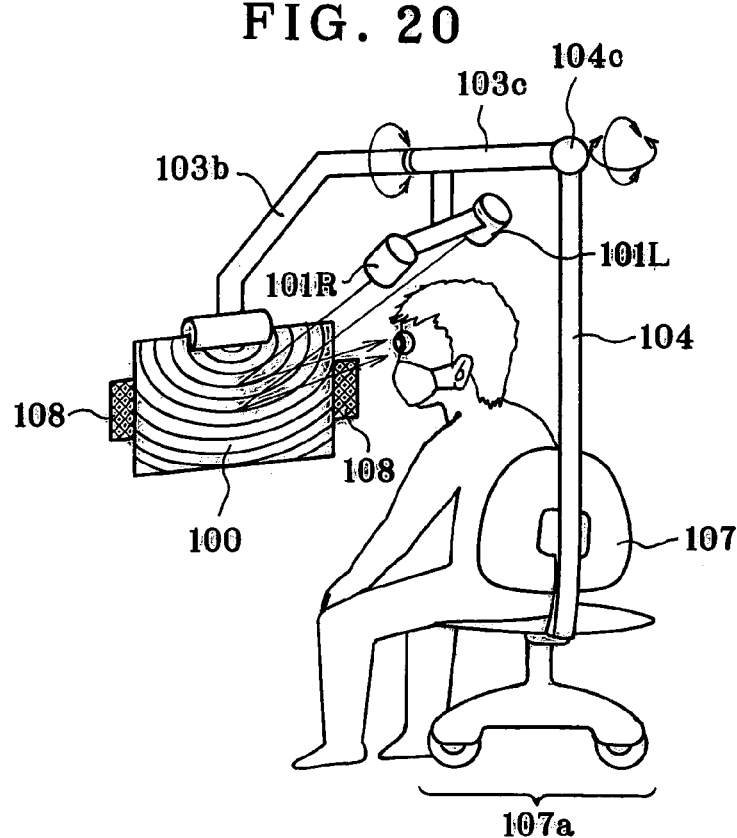
FIG. 20 is illustrative of a further specific product incorporating the stereoscopic viewing system of the invention.

FIG. 20 is illustrative of yet another product incorporating the stereoscopic viewing system of the invention, wherein a support arm 104 is attached to a surgical chair 107. A display panel 100 is attached to one holder 103b, and projectors 101L and 101R are attached to another holder 103c so that the display panel 100 can be turned in a given direction with respect to the projectors 101L and 101R. The holder 103c with the projectors 101L and 101R mounted on it is attached to the support arm 104 via a joint 104c for 360° rotation, so that the display panel 100 and the projectors 101L and 101R can be turned in a given direction. Further, the display panel 100 is provided with grips 108 on both sides, so that the direction of the display panel 100 can easily be adjusted without direct contact with the display panel 100. The surgical chair 107 is further provided with a caster 107a for carrying the surgical chair 107 to change the viewing position.

Figure 21:
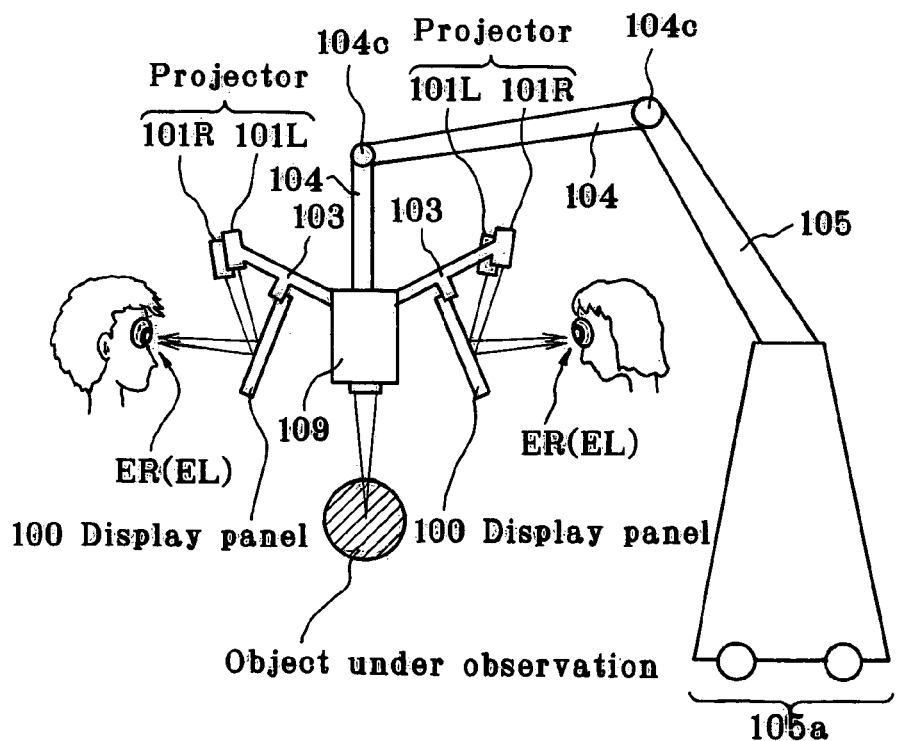
FIG. 21 is illustrative of a further specific product incorporating the stereoscopic viewing system of the invention.

FIG. 21 is illustrative of a further specific product incorporating the stereoscopic viewing system of the invention, wherein a support arm 104 is connected with two holders 103 and an image input 109 of a surgical microscope. Each holder 103 holds projectors 101L and 101R and a display panel 100. It is noted that the support arm 104 is connected via a joint 104c to a support body 105 having a caster 105a, so that it is rotatable by means of the joint 104c. The image input 109 of the surgical microscope has two built-in cameras. Input images are sent to the projectors 101L and 101R of the stereoscopic projection viewing system, so that a plurality of viewers can simultaneously view stereoscopic images at a surgical microscope.

It is noted that the stereoscopic viewing system products shown in FIGS. 18–21 could have applications for display devices of surgical microscopes, display devices of endoscopes, display devices of medical stereoscopic information images, display devices of entertainments such as computer game machines, display devices of business-dedicated stereoscopic (3D) images such as various stereoscopic (3D) CAD images, etc.

Figure 22:
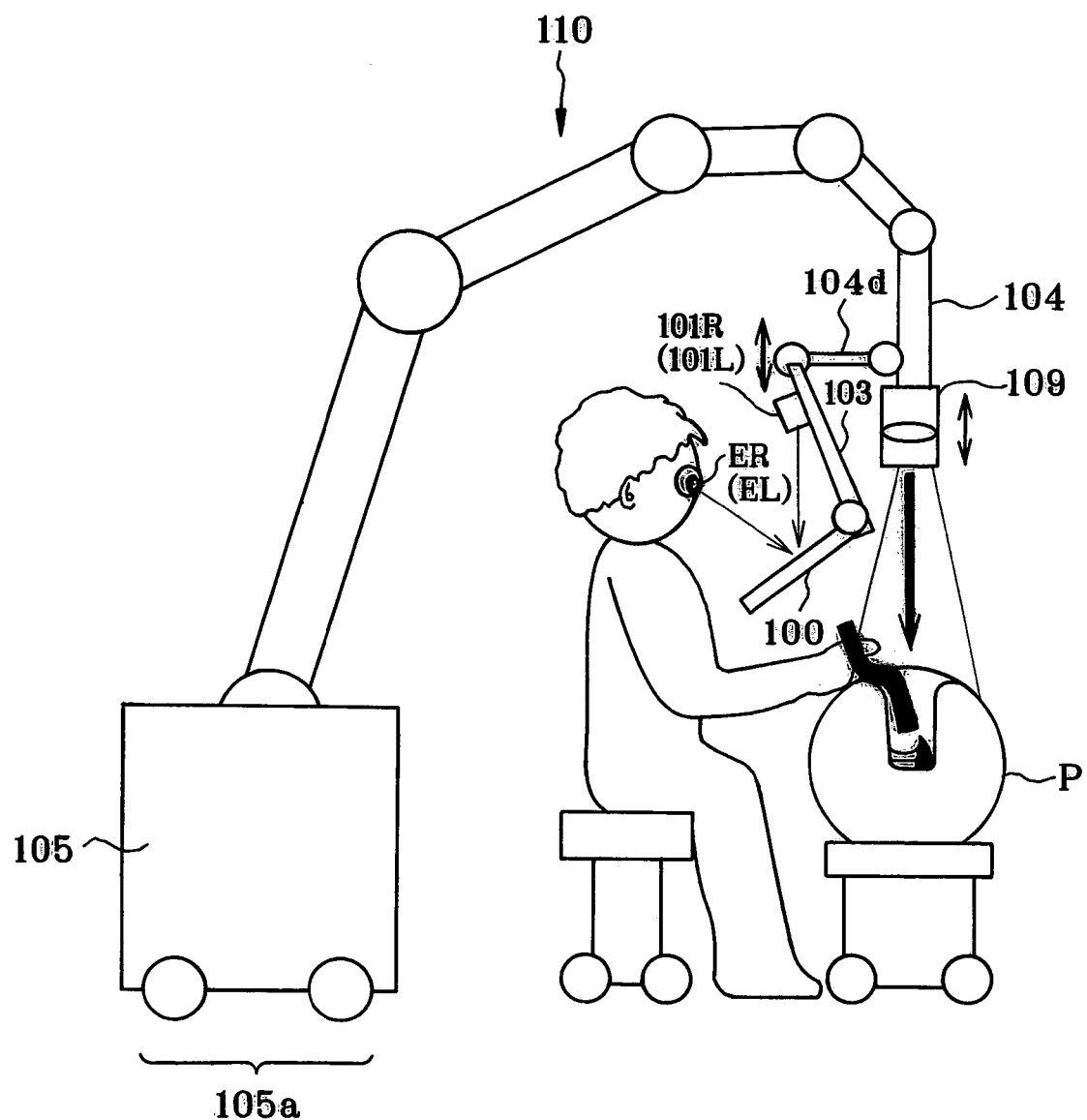
FIG. 22 is illustrative of one specific surgical stereoscopic viewing system incorporating the projection viewing system of the invention.

FIG. 22 is illustrative of one specific surgical stereoscopic viewing system incorporating the projection viewing system of the invention, wherein a universal arm 110 is attached to a support body 105 having a caster 105a, and a support arm 104 is attached to the universal arm 110. Three-dimensionally movable, the support arm 104 is rotatable through 360°. A holder 103 is mounted on the support arm 104 via a joint 104d. This holder 103, too, is movable and rotatable. The holder 103 is provided with projectors 101L and 101R and a display panel 100. On the other hand, the support arm 104 is provided at its end with an image input 109 of a surgical microscope. The image input 109 has two built-in cameras for taking pictures of an affected site of a patient P. The taken pictures are sent as input images to the stereoscopic projection viewing system, more specifically to the projectors 101L and 101R. With the stereoscopic viewing system product, it is thus possible to perform operation while viewing stereoscopic images of the affected area of the patient P.

Figure 23:
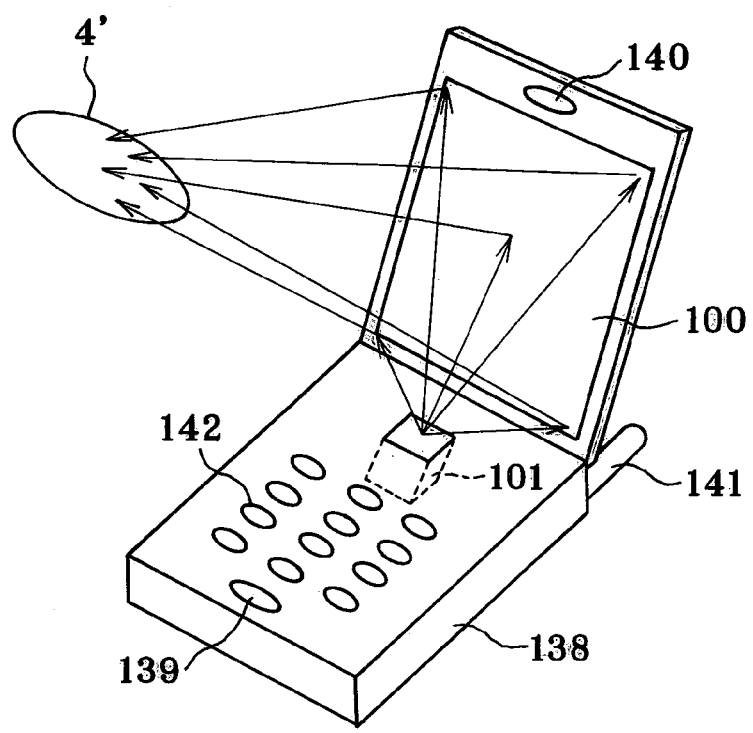
FIG. 23 is a perspective view of one specific cellular phone to which the projection viewing system of the invention is applied.
Figure 24:
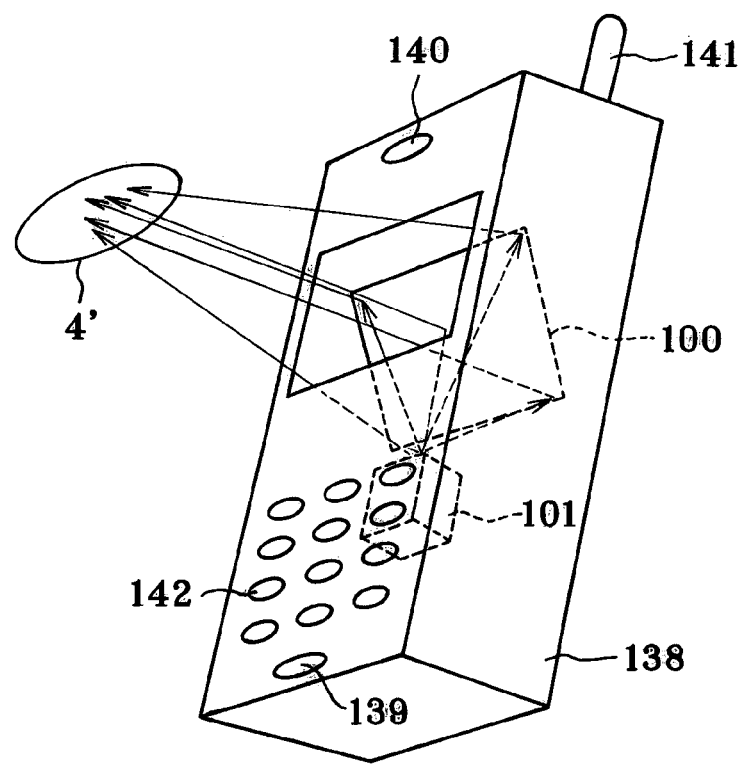
FIG. 24 is a perspective view of another specific cellular phone to which the projection viewing system of the invention is applied.

In accordance with the invention, the reflection type display panel 100 comprising the concave mirror 2 or Fresnel reflecting mirror 2' that is the reflection type eyepiece optical system and the diffusing plate 3 of a transmission hologram located on the front surface thereof could be used as a projection viewing system for displaying not only stereoscopic images but single images as well. A typical embodiment of such a projection viewing system, for instance, a cellular phone is shown in FIGS. 23 and 24. The projection viewing system of the invention is used for the projection and display of images taken of the user himself, the person on the other end, etc. and information such as telephone numbers. Here a projector 101 (built up of a set of projection optical systems 1R, 1G and 1B for R, G and B, as is the case with FIGS. 17–22) and a reflection type display panel 100 are provided so that an image on the display plane can reasonably be viewed at the position of an exit pupil 4' thereof. A cellular phone 138 comprises a microphone 139 for entering the voice of an operator as information therein, a speaker 140 for producing the voice of a person at the other end, an antenna 141 for transmitting and receiving communication waves, an operating button 142 for allowing the operator to enter information and the projection viewing system of the invention. The cellular phone of FIG. 23 has a mechanism for opening or closing the display panel 100 with respect to the cellular phone 138, so that the cellular phone 138 can be folded down during carrying and so received in a pocket or the like. In the cellular phone of FIG. 24, a display panel 100 is fixed in the body of a cellular phone 138, so that the cellular phone can be received in the pocket or the like while it is unfolded.

The projection optical system of the invention as described above could be embodied as follows.

(1) A projection optical system comprising at least three projection optical systems, each of which comprises a display device, for magnifying and projecting an image shown on said display device, a concave mirror for projecting exit pupils of said at least three projection optical systems onto a viewer side and a diffusing plate comprising a transmission hologram, which is located near to images projected through said at least three projection optical systems to magnify images of the exit pupils of said at least three projection optical systems upon projected through said concave mirror, characterized in that the images of the exit pupils of the projection optical systems, projected by said concave mirror and magnified through said diffusing plate comprising a transmission hologram are projected in a mutual, at least partially overlapping manner.

(2) The projection optical apparatus according to (1) above, characterized in that in an arrangement wherein light rays propagating from said at least three projection optical systems to said magnified images of the exit pupils of the projection optical systems transmit twice through said diffusing plate comprising a transmission hologram, an angle of first transmission of said light rays transmitting through said diffusing plate comprising a transmission hologram is different from an angle of second transmission of said light rays through said diffusing plate comprising a transmission hologram.

(3) The projection optical apparatus according to (1) or (2) above, characterized in that said concave mirror comprises a Fresnel concave reflecting mirror.

(4) The projection optical apparatus according to any one of (1) to (3) above, characterized in that said diffusing plate comprising a transmission hologram has an angle of diffusion of up to 40° at a full width where light intensity goes down to $1/10$.

(5) The projection optical apparatus according to any one of (1) to (4) above, characterized in that axial chief rays from said at least three projection optical systems are obliquely incident on said concave mirror.

(7) The projection optical apparatus according to any one of (1) to (6) above, characterized in that zero-order light that is not diffracted at first and second transmissions through said diffusing plate comprising a transmission hologram is not incident on an image of said magnified pupil image of each projection optical system.

(8) The projection optical apparatus according to any one of (1) to (7) above, characterized in that said diffusing plate comprising a transmission hologram has a bending action by diffraction.

(9) The projection optical apparatus according to any one of (1) to (8) above, characterized by satisfaction of the following condition:

$$10° < \gamma < 20° \quad (3)$$

where γ is the angle of bending of a d-line axial chief ray by said diffusing plate comprising a transmission hologram.

(10) The projection optical apparatus according to any one of (1) to (9) above, characterized by satisfaction of the following relation:

$$5° < \beta < 20° \quad (4\text{-}1)$$

where β is the angle of incidence of a d-line axial chief ray on said concave mirror.

(11) The projection optical apparatus according to any one of (1) to (10) above, characterized by satisfaction of the following relation:

$$0.5 < \gamma/\beta < 2 \quad (5)$$

where γ is the angle of bending of a d-line axial chief ray by said diffusing plate comprising a transmission hologram, and β is the angle of incidence of a d-line axial chief ray on said concave mirror.

(12) The projection optical apparatus according to any one of (1) to (11) above, characterized in that color separated images are projected from said at least three projection systems near to said diffusing plate comprising a transmission hologram in an overlapping fashion.

As can be appreciated from the foregoing, the present invention provides a projection optical apparatus that is fast and of satisfactory illumination efficiency albeit being of simple construction and compact size by making use of a diffuse hologram that projects the exit pupil of a projection optical system onto a viewing position and magnifying the thus projected exit pupil image to a limited area.

I claim:

1. A projection optical apparatus, comprising:
a projection unit comprising a display device and projection optical systems,
a concave mirror for projecting exit pupils of said projection optical systems onto a given position, and
a diffusing plate located near to images projected through said projection optical systems, wherein:
at least three such projection units are provided,
said projection optical systems magnify and projects an image appearing on said display device, and said diffusing plate has such a diffusion action that said exit pupil images are each projected in an at least partially overlapping fashion, wherein said diffusing plate is a transmission hologram and at least three display device among the display devices in said projection units display images of mutually different colors.

2. The projection optical apparatus according to claim 1, wherein:
said transmission hologram is located such that a light ray from said display device to said exit pupils transmits twice through said transmission hologram, and further, said transmission hologram is located such that an angle of first transmission through said transmission hologram is different from an angle of second transmission through said transmission hologram.

3. The projection optical apparatus according to claim 1, wherein: said concave mirror comprises a Fresnel concave reflecting mirror.

4. The projection optical apparatus according to claim 1, wherein:
said diffusing plate has such a property that an angle of diffusion at full width half maximum is up to 20°.

5. The projection optical apparatus according to claim 1, wherein:
said diffusing plate has such a property that an angle of diffusion at a full width where light intensity becomes 1/10 is up to 40°.

6. The projection optical apparatus according to claim 1, wherein:
said projection units and said concave mirror are positioned such that axial chief rays from said projection optical systems in each projection unit are obliquely incident on said concave mirror.

7. The projection optical apparatus according to claim 1, wherein:
both zero-order light upon the first transmission through said transmission hologram and zero-order light upon the second transmission through said transmission hologram pass through a position different from those of said exit pupil images.

8. The projection optical apparatus according to claim 1, wherein: said diffusing plate has a bending action by diffraction.

9. The projection optical apparatus according to claim 1, which satisfies the following condition:

$$10° < \gamma < 20° \quad (3)$$

where y is an angle of bending of a d-line axial chief ray through said diffusing plate.

10. The projection optical apparatus according to claim 1, which satisfies the following condition:

$$5° < \beta < 20° \quad (4\text{-}1)$$

where β is an angle of incidence of a d-line axial chief ray on said concave mirror.

11. The projection optical apparatus according to claim 1, which satisfies the following condition:

$$0.5 < \gamma/\beta < 2 \quad (5)$$

where γ is an angle of bending of a d-line axial chief ray through said diffusing plate, and β is an angle of incidence of a d-line axial chief ray on said concave mirror.

12. A stereoscopic viewing system, comprising:
a projection unit comprising a display device and projection optical systems,
a first projection member comprising at least three such projection units,
a second projection member comprising at least three such projection units,
a concave mirror for projecting an exit pupil of each of said projection optical systems onto a given position, and
a diffusing plate located near to an image projected through said first projection member and an image projected through said second projection member, wherein:
said projection optical system magnifies and projects an image appearing on said display device,
said concave mirror projects an exit pupil of each of said projection optical systems in said first projection member onto a first given position, and projects an exit pupil of each of the projection optical systems in said second projection member onto a second given position, and
said diffusing plate has such a diffusion action that each of exit pupil images at said first given position is projected in an at least partially overlapping fashion and each of exit pupil images at said second given position is projected in an at least partially overlapping fashion.

* * * * *